(12) United States Patent
Sambongi et al.

(10) Patent No.: US 8,035,853 B2
(45) Date of Patent: Oct. 11, 2011

(54) IMAGE PROCESSING APPARATUS WHICH CALCULATES A CORRECTION COEFFICIENT WITH RESPECT TO A PIXEL OF INTEREST AND USES THE CORRECTION COEFFICIENT TO APPLY TONE CORRECTION TO THE PIXEL OF INTEREST

(75) Inventors: Masao Sambongi, Hino (JP); Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 1129 days.

(21) Appl. No.: 11/587,780

(22) PCT Filed: Apr. 22, 2005

(86) PCT No.: PCT/JP2005/008256

§ 371 (c)(1),
(2), (4) Date: Oct. 26, 2006

(87) PCT Pub. No.: WO2005/104531

PCT Pub. Date: Nov. 3, 2005

(65) Prior Publication Data

US 2007/0165282 A1      Jul. 19, 2007

(30) Foreign Application Priority Data

Apr. 27, 2004   (JP) ................................. 2004-131096

(51) Int. Cl.
  *H04N 1/40* (2006.01)
(52) U.S. Cl. ....................................................... 358/1.9
(58) Field of Classification Search .................... 358/1.9
See application file for complete search history.

(56) References Cited

U.S. PATENT DOCUMENTS

| 5,923,775 | A  | * | 7/1999  | Snyder et al. ................. 382/172 |
| 6,643,398 | B2 | * | 11/2003 | Moriwaki ..................... 382/167 |
| 7,440,612 | B2 | * | 10/2008 | Ogata et al. ................... 382/167 |
| 2003/0218776 | A1 | * | 11/2003 | Morimoto et al. ............. 358/2.1 |
| 2003/0228055 | A1 | * | 12/2003 | Kanagawa et al. ........... 382/162 |
| 2004/0041926 | A1 | * | 3/2004  | Takano et al. ................. 348/241 |

FOREIGN PATENT DOCUMENTS

| JP | 9-331539 A    | * | 12/1997 |
| JP | 2000-354179 A | * | 12/2000 |
| JP | 2003-069821 A | * | 3/2003  |
| JP | 2003-69825 A  | * | 3/2003  |
| JP | 2003-101814 A | * | 4/2003  |
| JP | 2003-230022 A | * | 8/2003  |
| JP | 3465226 B2    | * | 8/2003  |
| JP | 2003-309763 A | * | 10/2003 |

* cited by examiner

*Primary Examiner* — Benny Tieu
*Assistant Examiner* — Qian Yang
(74) *Attorney, Agent, or Firm* — Holtz, Holtz, Goodman & Chick PC

(57) ABSTRACT

The invention provides an image signal processing apparatus, an image signal processing program and an image signal recording medium, each capable of generating high-definition image signals with no or little artifacts. The image signal processing apparatus adapted to implement tone correction of an image signal comprises correction coefficient calculation block (112) for calculating a correction coefficient for a pixel of interest in that image signal and a neighborhood area, transformation block (110) for applying tone correction processing to that pixel of interest, and correction block (111) for using that correction coefficient to make correction of each pixel after that tone correction processing. An image signal of each pixel of interest from correction block (111) is forwarded to compression block (113), and at a time when all image signals are in order, compression processing such as known JPEG is applied to them for their forwarding to output block (114).

30 Claims, 19 Drawing Sheets

FIG. 13(a)

— Contol signal
-------- Other signals

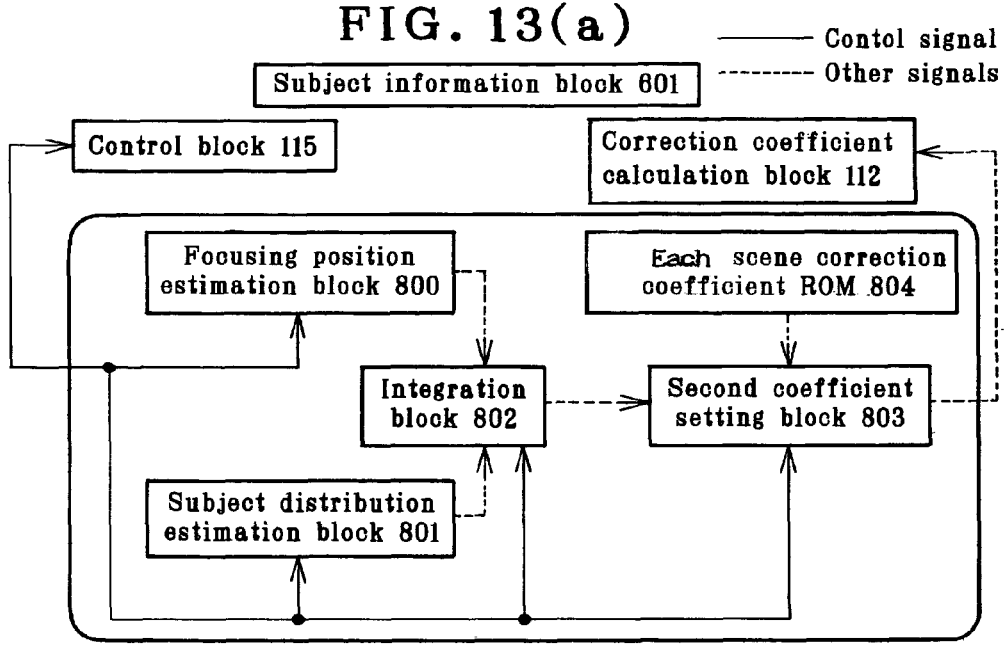

FIG. 13(b)

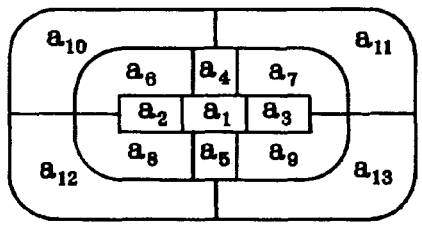

FIG. 13(c)

| Focusing information | Photometry information | Objects' distribution situation | Type | Correction coeffcient |
|---|---|---|---|---|
| Grater than 5 m | S3>Th1 | Scene with the sky above | Type1 | 0.8 |
| | S3<Th1 | Scene with no (little) sky above | Type2 | 1.0 |
| 1m~5m | S2>Th2 | Portrait of one figure | Type3 | 0.7 |
| | S2<Th2 | Portrait of two or more figures | Type4 | 0.8 |
| Less than 1 m | S1>Th3 | Close-up of one single object | Type5 | 1.0 |
| | S1<Th3 | Close-up of two or more objects | Type6 | 0.9 |

IMAGE PROCESSING APPARATUS WHICH CALCULATES A CORRECTION COEFFICIENT WITH RESPECT TO A PIXEL OF INTEREST AND USES THE CORRECTION COEFFICIENT TO APPLY TONE CORRECTION TO THE PIXEL OF INTEREST

This application is a U.S. National Phase Application under 35 USC 371 of International Application PCT/JP2005/008256 filed Apr. 22, 2005.

ART FIELD

The present invention relates generally to a processing apparatus adapted to independently apply tone correction to an image signal for each area, and more particularly to an image signal processing apparatus, an image signal processing program and an image recording medium, each capable of considering noise characteristics or taking scenes to generate image signals that have high definition and no artifacts.

BACKGROUND ART

The bit width of the image signal (10 to 12 bit) in the input and image processing system is set more widely than that of final output signal (8 bit) to prevent the image quality deterioration by the cancellation of significant digits of the digital signal processing in a digital still camera and the video camera. In this case, it is necessary to convert the bit width to agree with the bit width of the output system. The bit width is converted by a fixed tone characteristic to a standard scene. Moreover, the technique that the bit width is converted to apply the tone characteristic of the scene is proposed.

For instance, JP-A 2003-69821 shows an example of main subject-conscious tone correction involving estimation of a taking situation. That publication also shows an example of prevention of artifacts such as noises by imposing some restriction on the obtained tone characteristics. On the other hand, a technique for independent tone correction of an image signal for each area is proposed as well. For instance, U.S. Pat. No. 3,465,226 discloses an example wherein an image signal is divided into areas based on texture information for adaptive tone correction of each area.

A problem with fixed tone characteristics in the prior art is that proper image signals are not obtained in unordinary situations with backlit, etc. Further, a problem with the technique of JP-A 2003-69821 is that satisfactory effects on improvements are not obtained in scenes of high contrast, because tone correction occurs in one-chip image signal vs. one tone characteristic relation. According to the technique of U.S. Pat. No. 3,465,226, although there are sufficient effects on improvements obtained even in scenes of high contrast, because tone correction occurs by independent tone characteristics for each area, yet there is no limitation to individual tone characteristics. This may cause extreme transformation, leading to another problem with the occurrence of artifacts such as increased noise components and a failure of color reproduction.

In view of such problems with the prior art as described above, the main object of the present invention is to provide an image signal processing apparatus, an image signal processing program and an image signal recording medium, wherein tone characteristics are independently calculated for each area, and restriction is independently set to tone characteristics for each area so that high-definition image signals can be generated with no or little artifacts.

DISCLOSURE OF THE INVENTION (1) To accomplish the above object, the first embodiment of the present invention provides an image signal processing apparatus for tone correction processing for an image signal, characterized by comprising:

a calculation means for calculating a correction coefficient for a pixel of interest and a neighborhood area in said image signal, a transformation means for applying tone correction to said pixel of interest, and a correction means for using said correction coefficient to make correction of each pixel after said tone correction. In the image signal processing apparatus according to the first embodiment of the present invention, the calculation means is equivalent to the correction coefficient calculation block 112 shown in FIGS. 1, 4, 7, and 8; the transformation means is equivalent to the transformation block 110 shown in FIGS. 1, 2, 3, and 8; and the correction means is equivalent to the correction block 111 shown in FIGS. 1, and 8. In a preferable embodiment of the image signal processing apparatus of the present invention, a correction coefficient for tone correction processing is calculated at the correction coefficient calculation block 112, tone correction processing is applied to each pixel of interest at the transformation block 110, and the correction coefficient is used on each pixel of interest at the correction block 111 to make correction of tone correction. According to this invention, tone correction is applied to an image signal for each pixel of interest and the correction coefficient for imposing restrictions to tone correction is calculated, so that the pixel of interest after tone correction is corrected using that correction coefficient. According to this arrangement, high-definition image signals are obtainable even in a scene of high contrast while artifacts such as increased noise components and a failure of color reproduction are suppressed. Further, the addition of correction processing to the same tone correction processing configuration as in the prior art ensures that the processing apparatus of the present invention is well compatible with, and so easily built in, an existing processing apparatus.

(2) The second embodiment of the present invention is directed to an image signal processing apparatus for tone correction processing for an image signal, characterized by comprising:

a calculation means for calculating a correction coefficient for a pixel of interest and a neighborhood area in said image signal, and a transformation means for using said correction coefficient to apply tone correction to said pixel of interest. This embodiment of the present invention is equivalent to the second embodiment shown in FIGS. 10-14. In the image signal processing apparatus according to the second embodiment of the present invention, the calculation means is equivalent to the correction coefficient calculation block 112 and the subject information block 601 shown in FIG. 13, and the transformation means is equivalent to the transformation block 110 shown in FIGS. 10, and 11. In a preferable embodiment of the image signal processing apparatus according to the present invention, the correction coefficient for tone correction processing is calculated at the correction coefficient calculation block 112 and the subject information block 601, and that correction coefficient is used to apply tone correction processing to each pixel of interest at the transformation block 110. According to this invention, the correction coefficient for imposing restrictions on tone correction for each pixel of interest is calculated, and that correction coefficient is used for independent tone correction. According to this arrangement, high-definition image signals are obtainable even in a scene of high contrast while artifacts such as increased noise components and a failure of color reproduction are suppressed. Further, the integral setting of placing restrictions on tone correction processing and tone correction ensures the installation of a low-cost processing apparatus.

(3) The third embodiment of the present invention is directed to an image signal processing apparatus for tone correction processing for an image signal, characterized by comprising:

a segmentation means for dividing said image signal into at least one or more areas, a calculation means for calculating a correction coefficient for each of said areas, a transformation means for applying tone correction to each of said areas, and a correction means for using said correction coefficient to make correction of each of said areas after said tone correction. This embodiment of the present invention is equivalent to the third embodiment shown in FIGS. 15-17. In the image signal processing apparatus according to the third embodiment of the present invention, the segmentation means is equivalent to the adaptive segmentation block 150 shown in FIGS. 15, and 16; the calculation means is equivalent to the correction coefficient calculation block 112 shown in FIG. 15; the transformation means is equivalent to the transformation block 110 shown in FIG. 15; and the correction means is equivalent to the correction block 111 shown in FIG. 15. In a preferable embodiment of the image signal processing apparatus of this invention, an image signal is divided at the adaptive segmentation block 150 into at least one or more areas, the correction coefficient for tone correction processing is calculated at the correction coefficient calculation block 112, tone correction processing is applied to each area at the transformation block 110, and the correction coefficient is used on each area at the correction block 111 to make correction of tone correction. In this invention, the image signal is divided into at least one or more areas, tone correction is independently implemented for each area and the correction coefficient for imposing restrictions on tone correction is calculated, and that correction coefficient is used to make correction of each area after tone correction. According to this arrangement, high-definition image signals are obtainable even in a scene of high contrast while artifacts such as increased noise components and a failure of color reproduction are suppressed. Further, the addition of correction processing to the same tone correction processing configuration as in the prior art ensures that the processing apparatus of the present invention is well compatible with, and so easily built in, an existing processing apparatus.

(4) The fourth embodiment of the present invention is directed to an image signal processing apparatus for tone correction processing for an image signal, characterized by comprising:

a segmentation means for dividing said image signal into at least one or more areas, a calculation means for calculating a correction coefficient for each of said areas, and a transformation means for using said correction coefficient to apply tone correction to each of said areas. This embodiment according to this invention is equivalent to the fourth embodiment shown in FIGS. 18-19. In the image signal processing apparatus according to the fourth embodiment of the present invention, the segmentation means is equivalent to the fixed segmentation block 600 shown in FIG. 18; the calculation means is equivalent to the correction coefficient calculation block 112 and the subject information block 601 shown in FIG. 18; and the transformation means is equivalent to the transformation block 110 shown in FIG. 18. In a preferable embodiment of this invention, an image signal is divided into at least one or more areas at the fixed segmentation block 600, the correction coefficient for tone correction processing is calculated at the correction coefficient calculation block 112 and the subject information block 601, and that correction coefficient is used on each area at the transformation block 110 for tone correction processing. According to this invention, an image signal is divided into at least one or more areas, the correction coefficient for imposing restrictions to tone correction for each area is calculated, and that correction coefficient is used for independent tone correction. According to this arrangement, high-definition image signals are obtainable even in a scene of high contrast while artifacts such as increased noise components and a failure of color reproduction are suppressed. Further, the integral setting of placing restrictions on tone correction processing and tone correction ensures the installation of a low-cost processing apparatus.

(5) In the invention of (1), the transformation means is characterized by further comprising a multiplication means for multiplying each pixel of interest after said tone correction processing by said correction coefficient. The embodiment of this invention is equivalent to the first embodiment shown in FIG. 1-9. In the invention of (5), the multiplication means is equivalent to the correction block 111 shown in FIGS. 1 and 8. In a preferable embodiment of the image signal processing apparatus according to this invention, each area after the tone correction processing is multiplied by the correction coefficient at the correction block 111. In the invention of (5), each pixel of interest is multiplied by the correction coefficient to make correction of tone correction. With this arrangement, artifacts such as increased noise components and a failure of color reproduction are suppressed. Further, this embodiment, because of being added to the later stage of prior art tone correction processing, is well compatible with, and so easily built in, an existing processing apparatus.

(6) In the invention of (2), the transformation means is characterized by further comprising a histogram calculation means for calculating a histogram of said pixel of interest and a neighborhood area, a clipping means for applying clipping processing to said histogram based on said correction coefficient, and a tone curve setting means for setting a tone curve based on a histogram after said clipping processing. The embodiment according to this invention is equivalent to the second embodiment shown in FIG. 10-14. In the invention of (6), the histogram calculation means is equivalent to the histogram creation block 301 shown in FIG. 11; the clipping means is equivalent to the clipping block 700 shown in FIG. 11; and the tone curve setting means is equivalent to the cumulative normalization block 302 shown in FIG. 11. In a preferable embodiment of the image signal processing apparatus according to this invention, a histogram for each area is created at the histogram creation block 301, clipping processing is applied at the clipping block 700 to the histogram based on the correction coefficient, and a tone curve well fit for an output bit width is set at the cumulative normalization block 302. In the invention of (6), the histogram is created for the pixel of interest and a neighborhood area to set the tone curve after the implementation of clipping processing based on the correction coefficient. According to this arrangement, high-definition image signals are obtainable even in a scene of high contrast while artifacts such as increased noise components and a failure of color reproduction are suppressed. Further, the integral setting of placing restrictions to tone correction processing and tone correction ensures the installation of a low-cost processing apparatus.

(7) In the invention of (1) or (2), the calculation means is characterized by further comprising a noise quantity estimation means for estimating the quantity of noise in said pixel of interest and a neighborhood area, an upper limit value setting means for setting the upper limit value of the noise quantity with respect to said pixel of interest, and a coefficient calculation means for calculating a correction coefficient based on said noise quantity and said upper limit value. The embodiment of this invention is equivalent to the first embodiment shown in FIGS. 1-9. In the invention of (7), the noise quantity estimation means is equivalent to the noise calculation block 402 and the noise function ROM 403 shown in FIG. 4; the upper limit value setting means is equivalent to the upper limit value setting block 404 shown in FIG. 4; and the upper limit value ROM 405 is equivalent to the upper limit gain calculation block 406 and the coefficient calculation block 407 shown in FIG. 4. In a preferable embodiment of the image signal processing apparatus according to this invention, the noise quantity about the pixel of interest is estimated at the noise quantity calculation block 402 and the noise function ROM 403, the upper limit value of allowable noise is set at the upper limit value setting block 404 and the upper limit value ROM 405, and the correction coefficient for imposing restrictions on tone correction is calculated at the upper limit gain calculation block 406 and the coefficient calculation block 407. In the invention of (7), the noise quantity is estimated for each pixel of interest and the upper limit value of a gain in tone correction processing is calculated from the acceptable noise quantity, and the correction coefficient is calculated from them. With this arrangement, an increase in the noise quantity due to tone correction can be reduced to less than the upper limit value of allowable noise, so that high-definition image signals are obtainable.

(8) In the invention of (1) or (2), the calculation means is characterized by further comprising a specific color extraction means for extracting a specific color of said pixel of interest and a neighborhood area, and a coefficient calculation means for calculating a correction coefficient based on the proportion of said pixel of interest occupied by said specific color. The embodiment of this invention is equivalent to the first embodiment shown in FIGS. 1-9. In the invention of (8), the specific color extraction means is equivalent to the specific color extraction block 452 and the specific color ROM 453 shown in FIG. 7; and the coefficient calculation means is equivalent to the upper limit gain setting block 456, the upper limit value ROM 457 and the coefficient calculation block 459 shown in FIG. 7. In a preferable embodiment of the image signal processing apparatus according to this invention, a given specific color included in the area is extracted at the specific color extraction block 452 and the specific color ROM 453, and the correction coefficient for imposing restrictions on tone correction is calculated at the upper limit gain setting block 456, the upper limit value ROM 457 and the coefficient calculation block 459. In the invention of (8), the occupied factor of the specific color for each pixel of interest and a neighborhood area is calculated, and the correction coefficient is calculated from it. With this arrangement, an increase in the noise quantity due to tone correction can be reduced to less than the upper limit value of allowable noise, so that high-definition image signals are obtainable.

(9) In the invention of (1) or (2), the transformation means is characterized by further comprising a histogram calculation means for calculating a histogram of said pixel of interest and a neighborhood area, and a tone curve setting means for setting a tone curve based on said histogram. The embodiment according to this invention is equivalent to the first embodiment shown in FIGS. 1-9. In the invention of (9), the histogram calculation means is equivalent to the histogram creation block 301 shown in FIG. 2, and the tone curve setting means is equivalent to the cumulative normalization block 302 shown in FIG. 2. In a preferable embodiment of the image signal processing apparatus according to this invention, the histogram of each area is created at the histogram creation block 301, and a histogram well fit for an output bit width is set at the cumulative normalization block 302. In the invention of (9), the tone curve is set based on the histogram of the pixel of interest and a neighborhood area. With this arrangement, high-definition image signals are obtainable even in a scene of high contrast.

(10) In the invention of (1) or (2), the transformation means is characterized by further comprising a tone curve setting means for setting a predetermined tone curve with respect to said pixel of interest. The embodiment according to this invention is equivalent to the first embodiment shown in FIGS. 1-9. In the invention of (10), the tone curve setting means is equivalent to the standard tone curve ROM 350 shown in FIG. 3. In a preferable embodiment of the image signal processing apparatus according to this invention, a standard tone curve is set with respect to the pixel of interest. With this arrangement, faster processing is achievable with no need of any condition judgment.

(11) In the invention of (3), the transformation means is characterized by further comprising a multiplication means for multiplying each of said areas after said tone correction by said correction coefficient. The embodiment according to this invention is equivalent to the third embodiment shown in FIG. 15-17. In the invention of (11), the multiplication means is equivalent to the correction block 111 shown in FIG. 15. In a preferable embodiment of the image signal processing apparatus according to this invention, each area after the tone correction processing is multiplied by the correction coefficient at the correction block 111. In the invention of (11), each area is multiplied by the correction coefficient to make tone correction. With this arrangement, artifacts such as increased noise components and a failure of color reproduction are suppressed. Further, this embodiment, because of being added to the later stage of prior art tone correction processing, is well compatible with, and so easily built in, an existing processing apparatus.

(12) In the invention of (1) or (3), the image signal processing apparatus is characterized by further comprising an avoidance means for avoiding a part of said transformation means and said correction means on condition that said correction coefficient satisfies a given condition. The embodiment according to this invention is equivalent to the first embodiment shown in FIGS. 1-9. In the invention of (12), the avoidance means is equivalent to the control block 115 shown in FIG. 1. In a preferable embodiment of the image signal processing apparatus according to this invention, when the correction coefficient satisfies a certain condition, a part of the processing is omitted because it is considered that the degree of freedom of the input signal concerning the tone correction is small. In the invention of (12), when the correction coefficient for the pixel of interest satisfies a certain condition, a part of the processing is omitted because it is considered that the degree of freedom of the input signal concerning the tone correction is small. With this arrangement, faster processing is achievable because of no need of applying adaptive tone correction processing and correction processing to a pixel of interest that is judged as not deserving any tone correction processing.

(13) In the invention of (4), the transformation means is characterized by further comprising a histogram calculation means for calculating a histogram of each of said areas, a clipping means for applying clipping processing to said histogram based on said correction coefficient, and a tone curve setting means for setting a tone curve based on a histogram after said clipping processing. The embodiment according to this invention is equivalent to the fourth embodiment shown in FIGS. 18 and 19. In the invention of (13), the histogram calculation means is equivalent to the histogram creation block 301 shown in FIG. 11; the clipping means is equivalent to the clipping block 700 shown in FIG. 11; and the tone curve setting means is equivalent to the cumulative normalization block 302 shown in FIG. 11. In a preferable embodiment of the image signal processing apparatus according to this invention, the histogram of each area is created at the histogram creation block 301, clipping processing is applied at the clipping block 700 to the histogram on the basis of the correction coefficient, and a tone curve well fit for an output bit width is set at the cumulative normalization block 302. In the invention of (13), the histogram of each area is created, and a tone curve is set after clipping processing based on the correction coefficient. According to this arrangement, high-definition image signals are obtainable even in a scene of high contrast while artifacts such as increased noise components and a failure of color reproduction are suppressed. Further, the integral setting of placing restrictions to tone correction processing and tone correction ensures the installation of a low-cost processing apparatus.

(14) In the invention of (3) or (4), the calculation means is characterized by further comprising a specific color extraction means for extracting a specific color of each of said areas, and a coefficient calculation means for calculating a correction coefficient based on a proportion of each of said areas occupied by said specific color. The embodiment according to this invention is equivalent to the third embodiment shown in FIGS. 15-17. In the invention of (14), the specific color extraction means is equivalent to the specific color extraction block 452 and the specific color ROM 453 shown in FIG. 7, and the coefficient calculation means is equivalent to the upper limit gain setting block 456, the upper limit value ROM 457 and the coefficient calculation block 459 shown in FIG. 7. In a preferable embodiment of the image signal processing apparatus according to this invention, a given specific color included in the area is extracted at the specific color extraction block 452, the specific color ROM 453 and the coefficient calculation block 459, and the correction coefficient for imposing restrictions on tone correction is calculated at the upper limit gain setting block 456, the upper limit value ROM 457 and the coefficient calculation block 459. In the invention of (14), the occupied factor of the specific factor for each area is calculated, and the correction coefficient is calculated from it. With this arrangement, an increase in the noise quantity due to tone correction can be reduced to less than the upper limit value about a subjectively important specific color, so that high-definition image signals are obtainable.

(15) In the invention of (3) or (4), the segmentation means is characterized by further comprising an adaptive segmentation means for dividing said image signal into areas based on at least one information of color information, luminance information and texture information of said image signal. This embodiment according to the present invention is equivalent to the third embodiment shown in FIGS. 15-17. In the invention of (15), the adaptive segmentation means is equivalent to the texture analysis block 201, the luminance analysis block 202, the hue analysis block 203 and the area extraction block 205 shown in FIG. 16. In a preferable embodiment of the image signal processing apparatus according to this invention, texture information, luminance information and hue information are analyzed at the texture analysis block 201, the luminance analysis block 202 and the hue analysis block 203, and the above information is integrated for area segmentation. In the invention of (15), texture information, luminance information and hue information are used for area segmentation. This arrangement is capable of high-precision area segmentation, making tone correction processing more effective.

(16) In the invention of (3) or (4), the segmentation means is characterized by further comprising a fixed segmentation means for dividing said image signal into areas of given size. This embodiment according to the present invention is equivalent to the fourth embodiment shown in FIGS. 18-19. In the invention of (16), the fixed segmentation means is equivalent to the fixed segmentation block 600 shown in FIG. 18. In a preferable embodiment of the image signal processing apparatus according to this invention, the image signal is divided at the fixed segmentation block 600 into areas of given size. In the invention of (16), the image signal is divided into areas of predetermined size. This arrangement makes faster processing and lower-cost installations possible.

(17) In the invention of (3) or (4), the calculation means is characterized by further comprising a noise quantity estimation means for estimating the quantity of noise in each of said areas, an upper limit value setting means for setting the upper limit value of the noise quantity with respect to each of said areas, and a coefficient calculation means for calculating a correction coefficient based on said noise quantity and said upper limit value. This embodiment according to the present invention is equivalent to the third embodiment shown in FIGS. 15-17. In the invention of (17), the noise quantity estimation means is equivalent to the noise calculation block 402 and the noise function ROM 403 shown in FIG. 4; the upper limit value setting means is equivalent to the upper limit value setting block 404 and the upper limit value ROM 405 shown in FIG. 4; and the coefficient calculation means is equivalent to the upper limit gain calculation block 406 and the coefficient calculation block 407 shown in FIG. 4. In a preferable embodiment of the image signal processing apparatus according to this invention, the noise quantity about each area is estimated at the noise quantity calculation block 402 and the noise function ROM 403, the upper limit value of allowable noise is set at the upper limit value setting block 404 and the upper limit value ROM 405, and the correction coefficient for imposing restrictions on tone correction is calculated at the upper limit gain calculation block 406 and the coefficient calculation block 407 In the invention of (17), the quantity of noise is estimated for each area and the upper limit value of a gain in tone correction processing is calculated from the quantity of allowable noise, and the correction coefficient is calculated from it. With this arrangement, an increase in the noise quantity due to tone correction can be reduced to less than the upper limit value of allowable noise, so that high-definition image signals are obtainable.

(18) In the invention of (3) or (4), the transformation means is characterized by further comprising a histogram calculation means for calculating a histogram of each of said areas, and a tone curve setting means for setting a tone curve based on said histogram. This embodiment according to the present invention is equivalent to the third embodiment shown in FIGS. 15-17. In the invention of (18), the histogram calculation means is equivalent to the histogram creation block 301 shown in FIG. 2, and the tone curve setting means is equivalent to the cumulative normalization block 302 shown in FIG. 2. In a preferable embodiment of the image signal processing apparatus according to this invention, the histogram of each area is created at the histogram creation block 301, and a tone curve well fit for an output bit width is set at the cumulative normalization block 302. In the invention of (18), a tone curve is set based on the histogram of each area. This arrangement ensures that high-definition image signals are obtained even in a scene of high contrast.

(19) In the invention of (3) or (4), the transformation means is characterized by further comprising a tone curve setting means for setting a predetermined tone curve with respect to each of said areas. This embodiment according to the present invention is equivalent to the third embodiment shown in FIGS. 15-17. In the invention of (19), the tone curve setting means is equivalent to the standard tone curve ROM 350 shown in FIG. 3. In a preferable embodiment of the image signal processing apparatus according to this invention, the standard tone curve is set by the standard tone curve ROM 350. In the invention of (19), there is a standard tone curve set for each area. With this arrangement, faster processing is achievable with no need of any condition judgment.

(20) In the invention of (2) or (4), the image signal processing apparatus is characterized by further comprising an avoidance means for avoiding a part of said transformation means on condition that said correction coefficient satisfies a given condition. This embodiment according to the present invention is equivalent to the second embodiment shown in FIGS. 10-14. In the invention of (20), the avoidance means is equivalent to the control block 115 shown in FIG. 10. In a preferable embodiment of the image signal processing apparatus according to this invention, when the correction coefficient satisfies a certain condition at the control block 115, it is possible to avoid a part of tone correction processing. In the invention of (20), when the correction coefficient for the pixel of interest satisfies a certain condition, a part of the processing is omitted because it is considered that the degree of freedom of the input signal concerning the tone correction is small. With this arrangement, faster processing is achievable because of no need of applying adaptive tone correction processing and correction processing to a pixel of interest that is judged as not deserving any tone correction processing.

(21) In the invention of (2) or (4), the calculation means is characterized by further comprising a subject information extraction means for extracting subject information from in said image signal, and a coefficient calculation means for calculating a correction coefficient based on said subject information. This embodiment according to the present invention is equivalent to the second embodiment shown in FIGS. 10-14. In the invention of (21), the subject information extraction means is equivalent to the focusing position estimation block 800, the subject distribution estimation block 801 and the integration block 802 shown in FIG. 13, and the coefficient calculation means is equivalent to the second coefficient setting block 803 and each scene correction coefficient ROM 804 shown in FIG. 13. In a preferable embodiment of the image signal processing apparatus according to this invention, a scene is estimated at the focusing position estimation block 800, the subject distribution estimation block 801 and the integration block 802, and a correction coefficient for imposing restrictions each scene tone correction is calculated at the second coefficient setting block 803 and the each scene correction coefficient ROM 804. In the invention of (21), the scene is estimated to find out a correction coefficient from it. With this arrangement, an increase in the quantity of noise due to tone correction is controllable for each taking scene so that high-definition image signals are obtainable. In addition, faster processing is achievable because the correction coefficient is calculated on one-chip image signal basis.

(22) In the invention of any one of (1) to (4), the upper limit value setting means is characterized by further comprising a recording means in which there is a noise quantity at a given ISO sensitivity recorded. This embodiment according to the present invention is equivalent to the first embodiment shown in FIGS. 1-9. In the invention of (22), the recording means is equivalent to the upper limit value ROM 405 shown. in FIG.

4. In a preferable embodiment of the image signal processing apparatus according to this invention, the quantity of noise at a given ISO sensitivity is recorded at the upper limit value ROM 405 as the upper limit value of allowable noise. In the invention of (22), the quantity of noise at the given ISO sensitivity is recorded as the quantity of acceptable noise. This arrangement facilitates the setting of the upper limit value, and is flexibly compatible with a variety of image signals.

(23) The first embodiment of the present invention is also directed to an image signal processing program, characterized by letting a computer implement steps, wherein said steps comprise a step of loading an image signal in the computer, a step of calculating a correction coefficient for a pixel of interest and a neighborhood area in said image signal, a step of applying tone correction to said pixel of interest, and a step of correcting each pixel after said tone correction processing based on said correction coefficient. The image signal processing program according to the first embodiment of the present invention is equivalent to the flowchart of FIG. 9. The step of loading the image signal in the computer is equivalent to Step 1 of FIG. 9; the step of calculating a correction coefficient for the pixel of interest in the image signal, to which tone correction is to be applied, and a neighborhood area is equivalent to Step 11; and the step of applying tone correction processing to the pixel of interest is equivalent to Step 12.

(24) The second embodiment of the present invention is also directed to an image signal processing program, characterized by letting a computer implement steps, wherein said steps comprise a step of loading an image signal in the computer, a step of calculating a correction coefficient for a pixel of interest and a neighborhood area in said image signal, and a step of applying tone correction to said pixel of interest based on said correction coefficient. The image signal processing program according to the second embodiment of the present invention is equivalent to the flowchart of FIG. 14. The step of loading the image signal in the computer is equivalent to Step 1 of FIG. 14; the step of calculating a correction coefficient for the pixel of interest in the image signal, to which tone correction is to be applied, and a neighborhood area is equivalent to Step 11; and the step of using said correction coefficient to apply tone correction processing to the pixel of interest is equivalent to Step 12.

(25) The third embodiment of the present invention is also directed to an image signal processing program, characterized by letting a computer implement steps, wherein said steps comprise a step of loading an image signal in the computer, a step of dividing said image signal into at least one or more areas, a step of calculating a correction coefficient for each of said areas, and a step of correcting each of said areas after said tone correction processing based on said correction coefficient. The image signal processing program according to the third embodiment of the present invention is equivalent to the flowchart of FIG. 17. The step of loading the image signal in the computer is equivalent to Step 1 of FIG. 17; the segmentation step is equivalent to Step 34; the step of calculating the correction coefficient is equivalent to Step 11; the step of implementing tone correction processing is equivalent to Step 12; and the step of making correction using the correction coefficient is equivalent to Step 13.

(26) The fourth embodiment of the present invention is also directed to an image signal processing program, characterized by letting a computer implement steps, wherein said steps comprise a step of loading an image signal in the computer, a step of dividing said image signal into at least one or more areas, a step of calculating a correction coefficient for each of said areas, and a step of applying tone correction processing to each of said areas based on said correction coefficient. The image signal processing program according to the fourth embodiment of the present invention is equivalent to the flowchart of FIG. 19. The step of loading the image signal in the computer is equivalent to Step 1 of FIG. 19; the segmentation step is equivalent to Step 40; the correction coefficient calculation step is equivalent to Step 11; and the step of implementing tone correction level is equivalent to Step 12.

(27) In the invention of (23), the step of implementing tone correction processing is characterized by comprising a step of multiplication by said correction coefficient of each pixel of interest after said tone correction processing. In the invention of (27), the multiplication by correction coefficient step is equivalent to Step 13 of FIG. 9.

(28) In the invention of (24), the step of implementing tone correction processing is characterized by comprising a step of calculating a histogram of said pixel of interest and a neighborhood area, a step of applying clipping processing to said histogram based on said correction coefficient, and a step of setting a tone curve based on a histogram after said clipping processing. In the invention of (28), the histogram calculation step is equivalent to Step 4 of FIG. 14; the step of implementing clipping processing is equivalent to Step 25; and the step of setting a tone curve is equivalent to Step 12.

(29) In the invention of (25), the step of implementing tone correction processing is characterized by comprising a step of multiplication by multiplying said areas after said tone correction processing by said correction coefficient. In the invention of (29), the multiplication by correction coefficient step is equivalent to Step 13 of FIG. 17.

(30) In the invention of (26), the step of implementing tone correction processing is characterized by comprising a step of calculating a histogram of each of said areas, a step of applying clipping processing to said histogram based on said correction coefficient, and a step of setting a tone curve based on a histogram after said clipping processing. In the invention of (30), the histogram calculation step is equivalent to Step 4 of FIG. 19; the clipping processing step is equivalent to Step 25; and the tone curve setting step is equivalent to Step 26. (31) In the invention of (23) or (24), the step of calculating a correction coefficient for said pixel of interest and a neighborhood area is characterized by comprising a step of estimating the quantity of noise in said pixel of interest and a neighborhood area, a step of setting the upper limit value of the quantity of noise with respect to said pixel of interest, and a step of calculating a correction coefficient based on said quantity of noise and said upper limit value. In the invention of (31), the noise quantity estimation step is equivalent to Step 8 of FIG. 9 and Step 8 of FIG. 14; the step of setting the upper limit value of the quantity of noise is equivalent to Step 10 of FIG. 9 and Step 10 of FIG. 14; and the correction coefficient calculation step is equivalent to Step 11 of FIG. 9 and Step 11 of FIG. 14.

(32) In the invention of (25) or (26), the step of calculating a correction coefficient for each of said areas is characterized by comprising a step of estimating a quantity of noise in each of said areas, a step of setting an upper limit value of the quantity of noise with respect to each of said areas, and a step of calculating a correction coefficient based on said quantity of noise and said upper limit value. In the invention of (32), the noise quantity estimation step is equivalent to Step 8 of FIGS. 17 and 19; the noise quantity upper limit value setting step is equivalent to Step 10 of FIGS. 17 and 19; and the correction coefficient calculation step is equivalent to Step 11 of FIGS. 17 and 19.

(33) In the invention of (25) or (26), the step of calculating a correction coefficient for each of said areas is characterized by comprising a step of extracting a specific color of each of said areas, and a step of calculating a correction coefficient based on a proportion of each of said areas occupied by said specific color. In the invention of (33), the specific color extraction step is equivalent to Step 34 of FIG. 17.

(34) In the invention of (24) or (26), the step of calculating a correction coefficient is characterized by comprising a step of extracting subject information from in said image signal, and a step of calculating a correction coefficient based on said subject information. In the invention of (34), the subject information extraction step is equivalent to Step 22 of FIGS. 14 and 19; and the correction coefficient calculation step is equivalent to Step 24 of FIGS. 14 and 19.

The inventions of (23)-(34) permit the computer to implement image signal processing on a program. For this reason, it is possible to implement high-definition image signal processing fast and precisely.

(35) Further, the first embodiment of the present invention is directed to a recording medium in which an image signal for application of tone correction to an image signal is recorded, characterized by comprising a means for holding image signal data subjected to calculation processing for calculating a correction coefficient for a pixel of interest and a neighborhood area in said image signal, transformation processing for applying tone correction to said pixel of interest, and correction processing for correcting said pixel of interest after said tone correction processing based on correction coefficient. In the invention of (35), the recording medium is equivalent to a recording medium like a memory card that is provided at the output block 114 of FIG. 1. The correction coefficient calculation processing is equivalent to the one at the correction coefficient calculation block 112 of FIG. 1; the tone correction processing is equivalent to the one at the transformation block 110 of FIG. 1; and the correction processing is equivalent to the one at the correction block 111 of FIG. 1.

(36) Further, the second embodiment of the present invention is directed to a recording medium in which an image signal for application of tone correction to an image signal is recorded, characterized by comprising a means for holding image signal data subjected to calculation processing for calculating a correction coefficient for a pixel of interest and a neighborhood area in said image signal, and transformation processing for applying tone correction to said pixel of interest. In the invention of (36), the recording medium is equivalent to a recording medium like a memory card that is provided at the output block 114 of FIG. 10. The correction coefficient calculation processing is equivalent to the one at the correction coefficient calculation block 112 of FIG. 10; and the tone correction processing is equivalent to the one at the transformation block 110 of FIG. 10.

(37) Further, the third embodiment of the present invention is directed to a recording medium in which an image signal for application of tone correction to an image signal is recorded, characterized by comprising a means for holding image signal data subjected to segmentation processing for dividing said image signal into at least one or more area, calculation processing for calculating a correction coefficient for each of said areas, transformation processing for applying tone correction to each of said areas, and correction processing for correcting each of said areas after said tone correction processing based on said correction coefficient. In the invention of (37), the recording medium is equivalent to a recording medium like a memory card that is provided at the output block 114 of FIG. 15. The correction coefficient calculation processing is equivalent to the one at the correction coefficient calculation block 112 of FIG. 15; the tone correction processing is equivalent to the one at the transformation block 110 of FIG. 15; and the correction processing is equivalent to the one at the correction block 111 of FIG. 15.

(38) Further, the fourth embodiment of the present invention is directed to a recording medium in which an image signal for application of tone correction to an image signal is recorded, characterized by comprising a means for holding image signal data subjected to segmentation processing for dividing said image signal into at least one or more area, calculation processing for calculating a correction coefficient for each of said areas, and transformation processing for applying tone correction processing to each of said areas based on said correction coefficient. In the invention of (38), the recording medium is equivalent to a recording medium like a memory card that is provided at the output block 114 of FIG. 18. The segmentation processing is equivalent to the one at the fixed segmentation block 600 of FIG. 18; the correction coefficient calculation processing is equivalent to the one at the correction coefficient calculation block 112 of FIG. 18; and the tone correction processing is equivalent to the one at the transformation block 110 of FIG. 18.

(39) In the invention of (35) or (36), the calculation processing is characterized by comprising noise quantity estimation processing for estimating the quantity of noise in said pixel of interest and a neighborhood area, upper limit value setting processing for setting the upper limit value of the quantity of noise with respect to said pixel of interest, and coefficient calculation processing for calculating a correction coefficient based on said quantity of noise and said upper limit value. In the invention of (39), the noise quantity estimation processing is equivalent to the one at the noise calculation block 402 of FIG. 4; the upper limit value setting processing is equivalent to the one at the upper limit value setting block 404 of FIG. 4; and the coefficient calculation processing is equivalent to the one at the coefficient calculation block 407 of FIG. 4.

(40) In the invention of (37) or (38), the calculation processing is characterized by comprising noise quantity estimation processing for estimating the quantity of noise in each of said areas, upper limit value setting processing for setting the upper limit value of the quantity of noise with respect to each of said areas, and coefficient calculation processing for calculating a correction coefficient based on said quantity of noise and said upper limit value. In the invention of (40), the noise quantity estimation processing is equivalent to the one at the noise calculation block 402 of FIG. 4; the upper limit value setting processing is equivalent to the one at the upper limit value setting block 404 of FIG. 4; and the coefficient calculation processing is equivalent to the one at the coefficient calculation block 407 of FIG. 4.

The inventions of (35) to (40) are each directed to a recording medium subjected to image signal processing. Thus, by incorporating such a recording medium in information processing apparatus such as a computer, it is possible to implement high-definition image signal processing.

With the present invention wherein tone characteristics are independently calculated for each area and restrictions on tone characteristics are independently set for each area, it is possible to provide an image signal processing apparatus capable of generating high-definition image signals with no or little artifacts. It is also possible to achieve image signal processing having such unique features on a program. In addition, because image signal data with such image signal processing applied to it are held in an image signal recording medium, it is possible to use an external system such as a computer.

BRIEF DESCRIPTION OF THE DRAWINGS

FIG. 13 is illustrative of the subject information block.

BEST MODE FOR CARRYING OUT THE INVENTION

Embodiments of the present invention are now explained with reference to the accompanying drawings.

Figure 1:
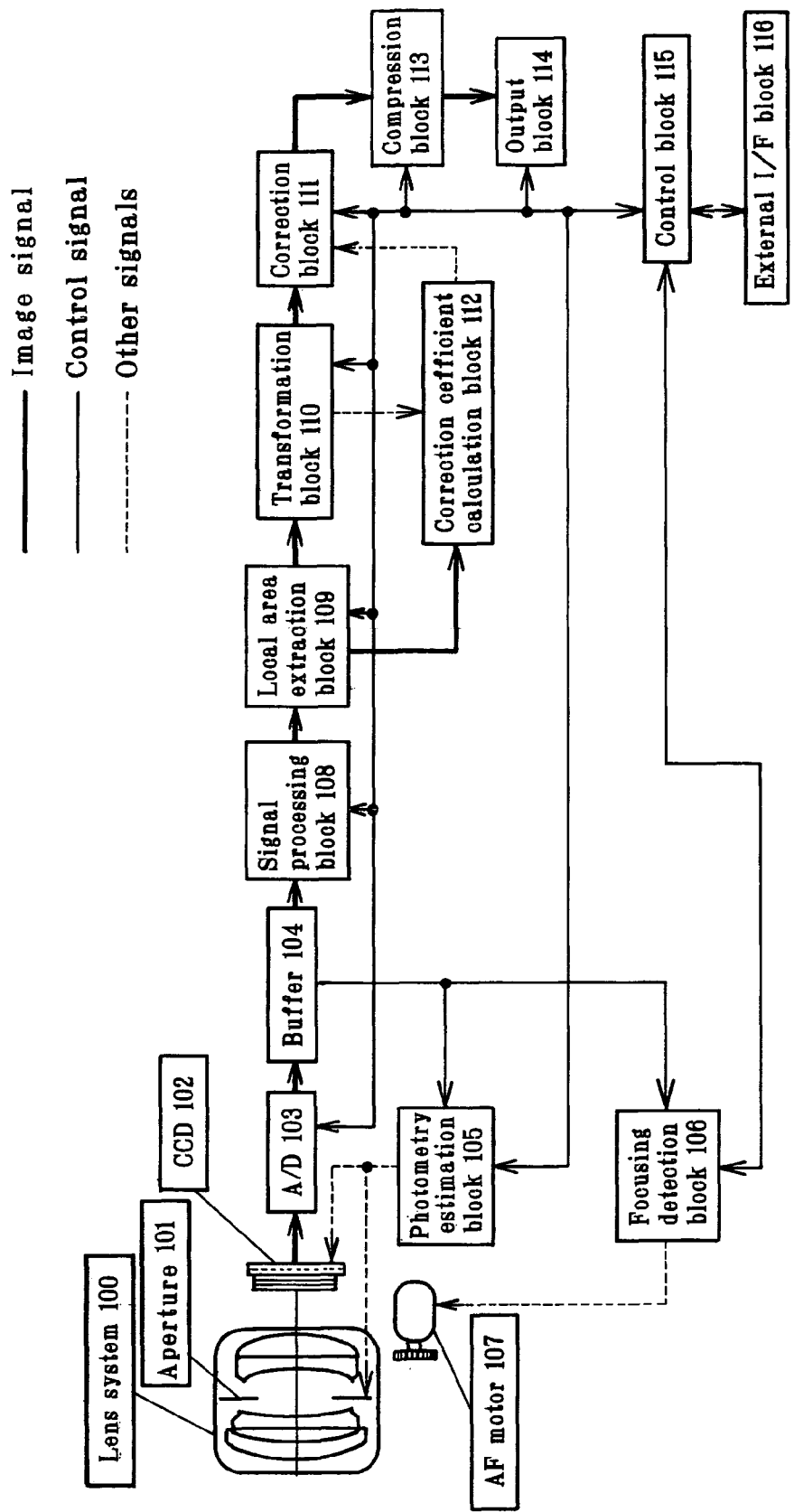
FIG. 1 is illustrative of the architecture of the first embodiment.
Figure 2:
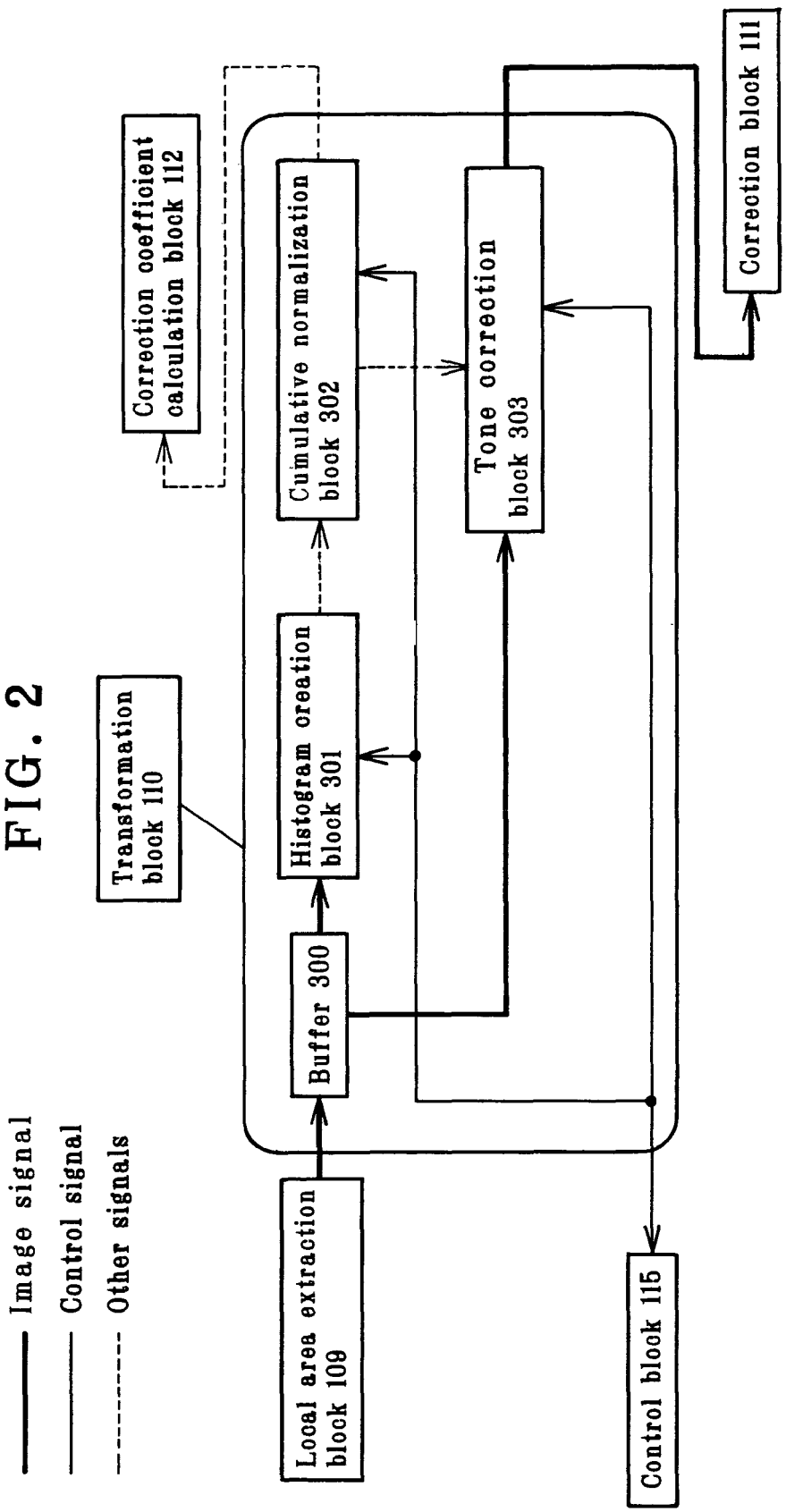
FIG. 2 is illustrative of one example of the architecture of the transformation block in the first embodiment.
Figure 3:
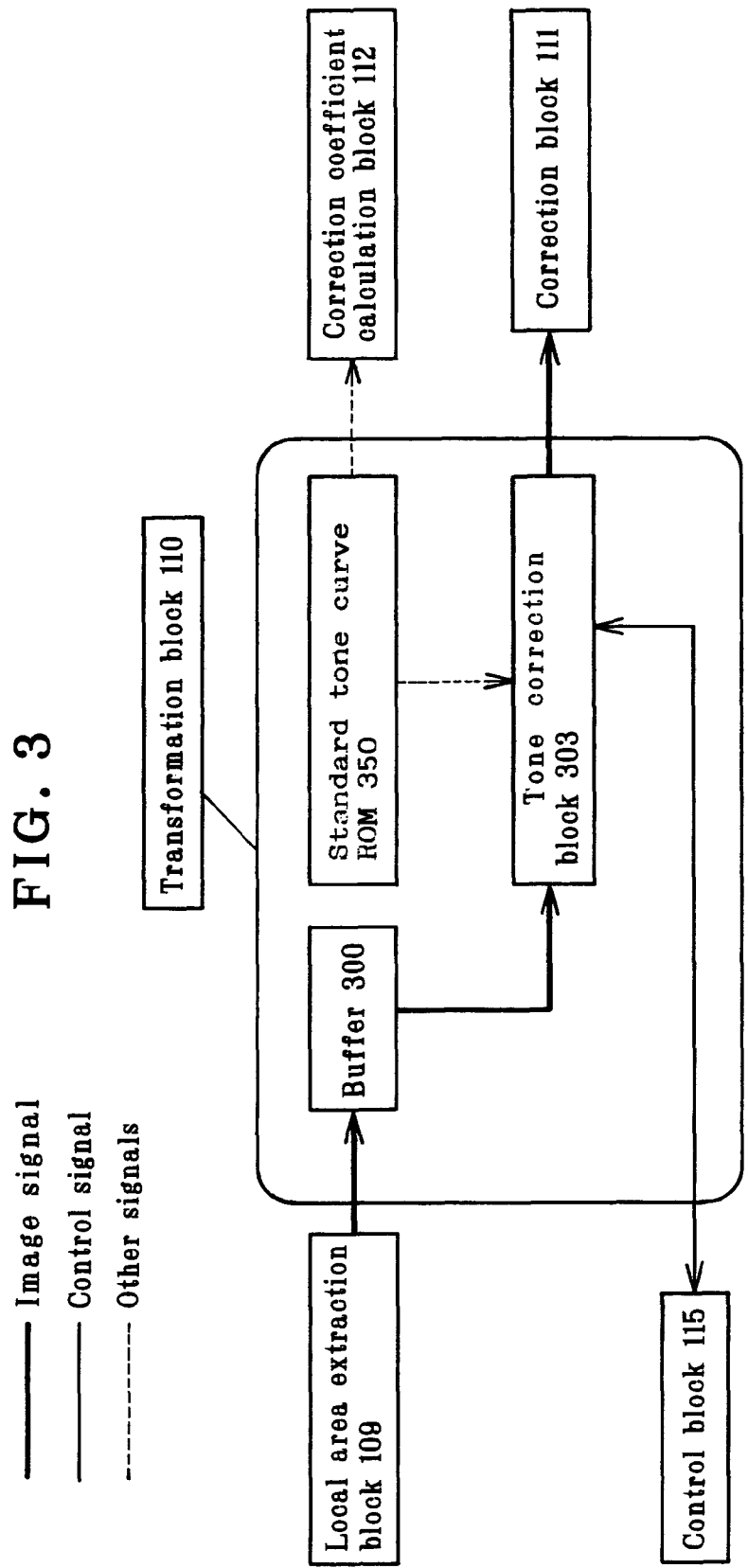
FIG. 3 is illustrative of another example of the architecture of the conversion block in the first embodiment.
Figure 4:
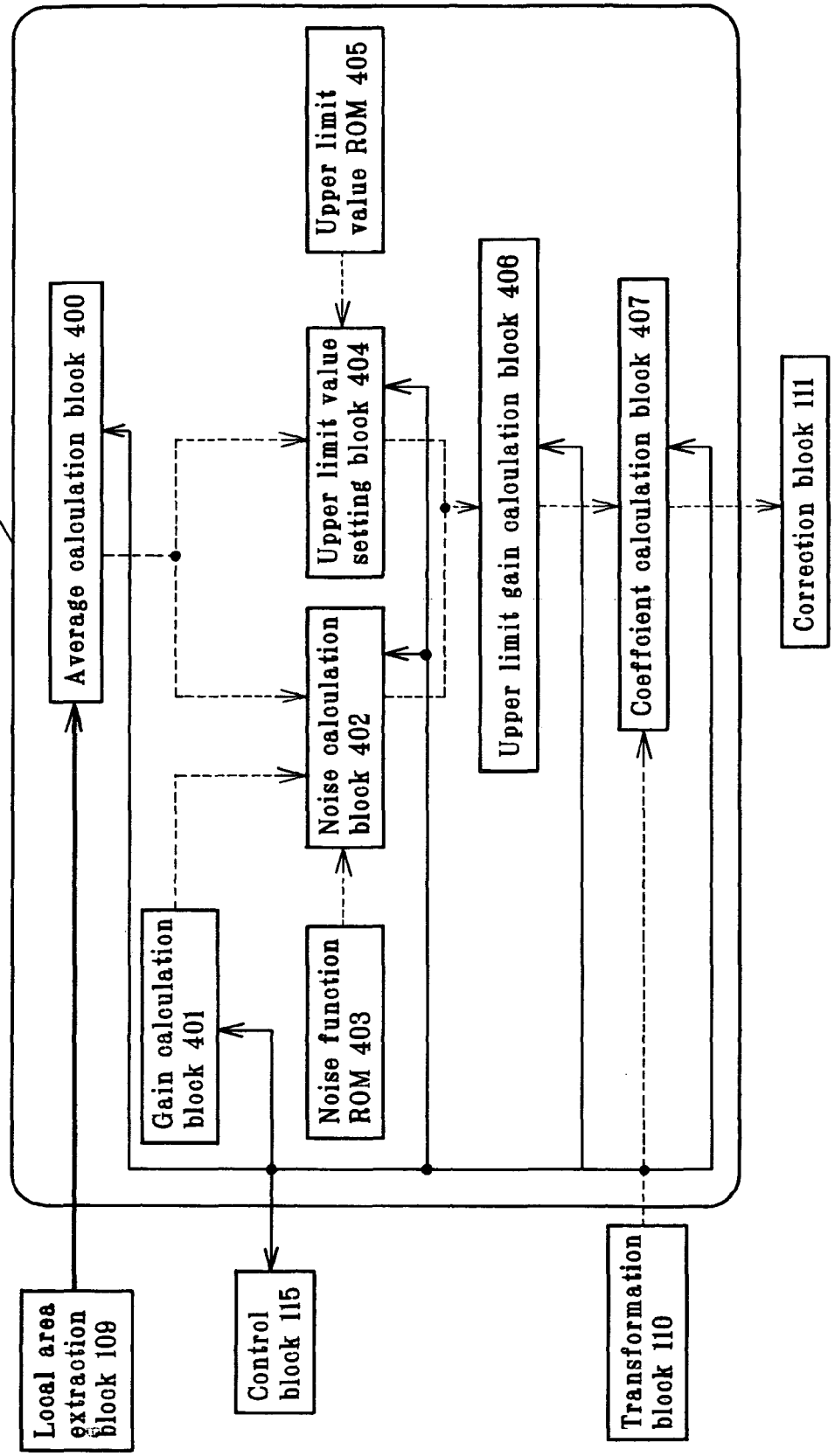
FIG. 4 is illustrative of the architecture of the correction coefficient calculation block in the first embodiment.
Figure 5:
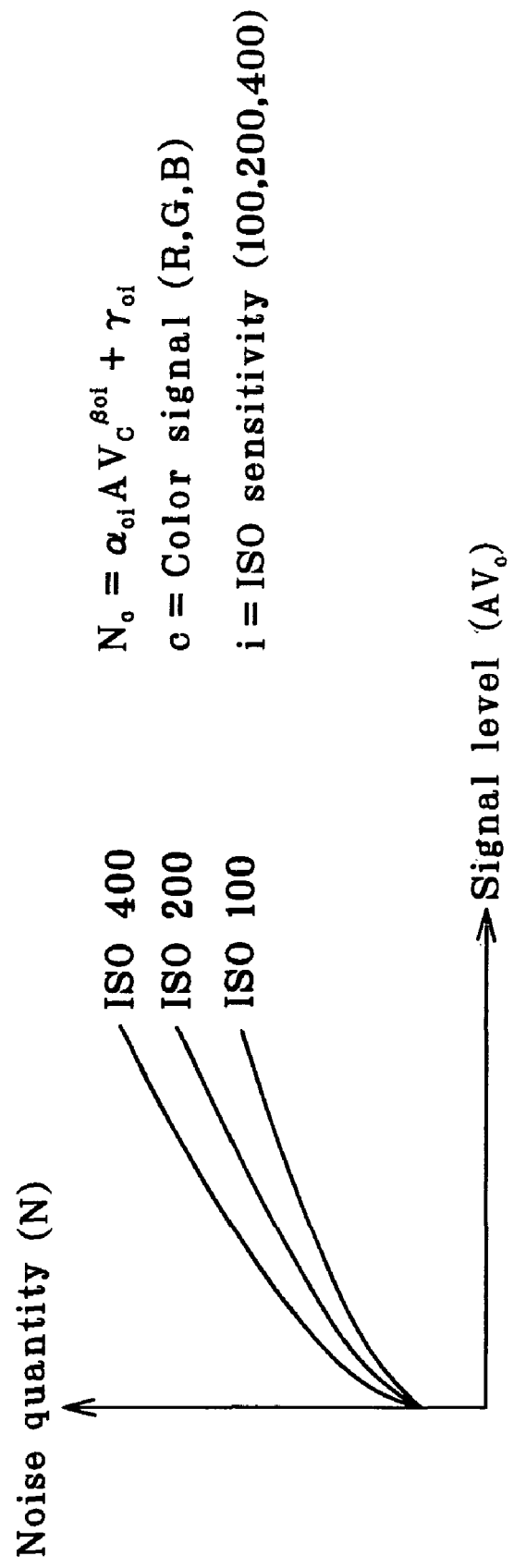
FIG. 5 is a graphical view of a noise quantity function.
Figure 7:
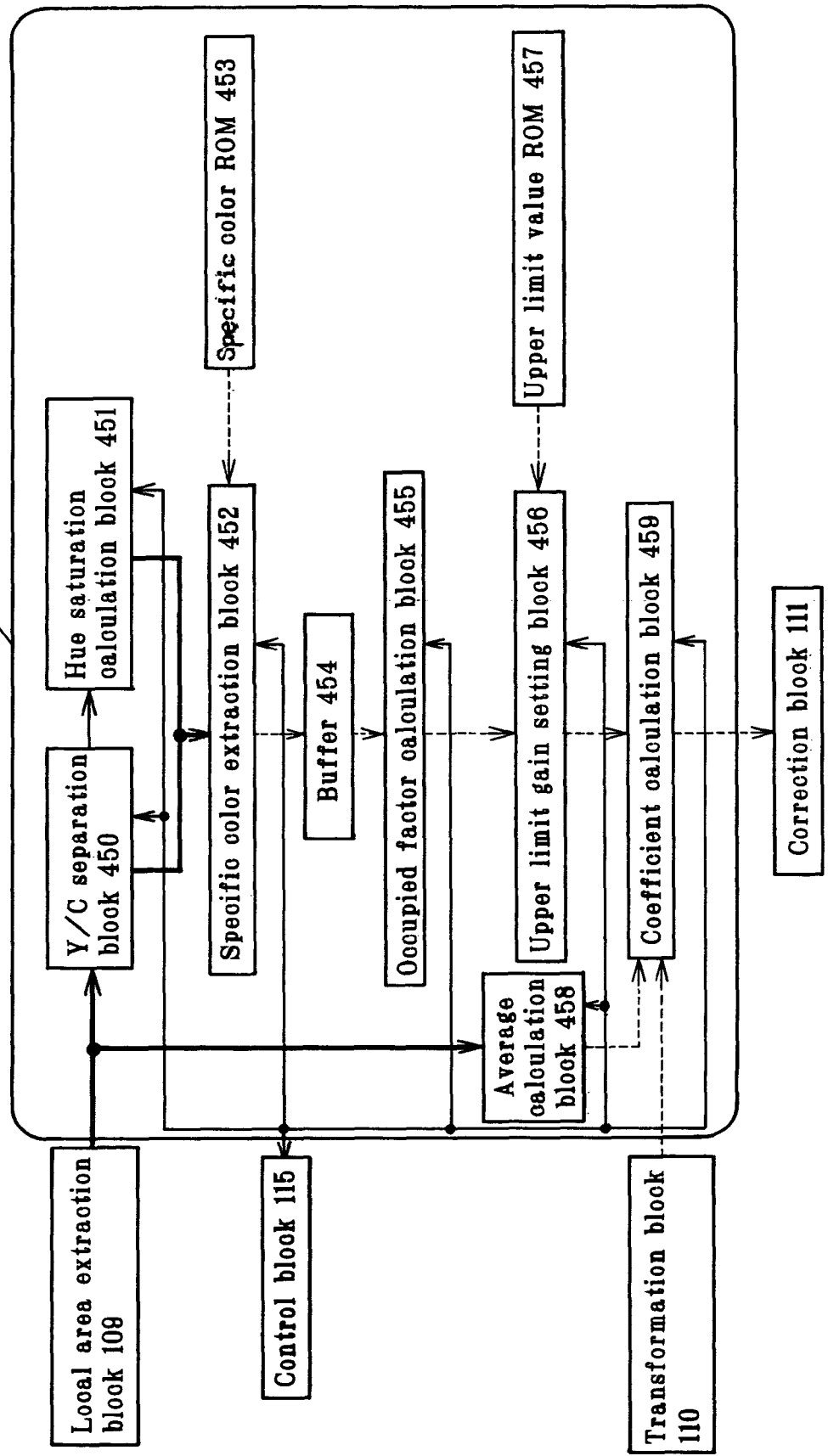
FIG. 7 is illustrative of another example of the architecture of the correction coefficient calculation block in the first embodiment.
Figure 8:
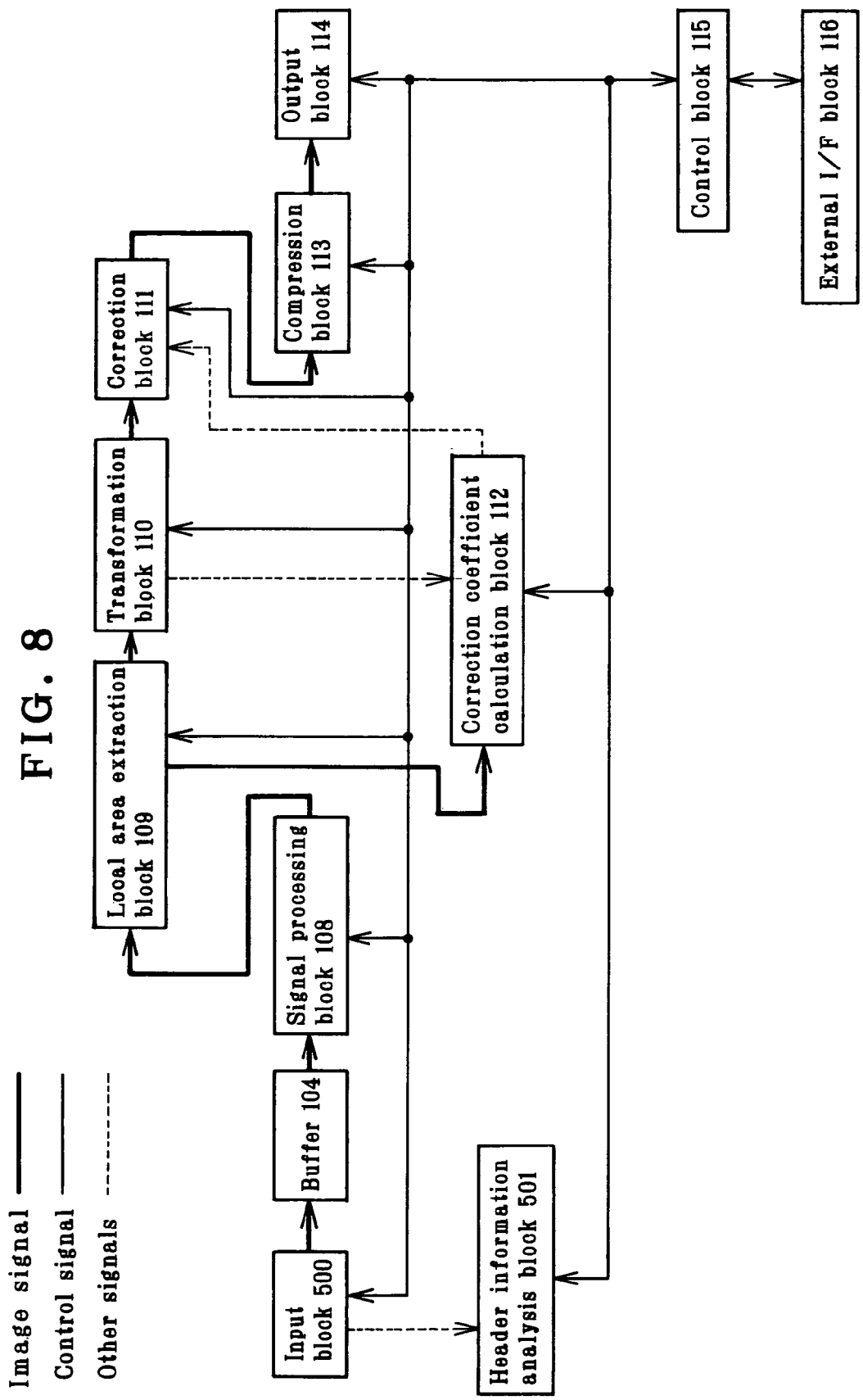
FIG. 8 is illustrative of another example of the architecture of the first embodiment.
Figure 9:
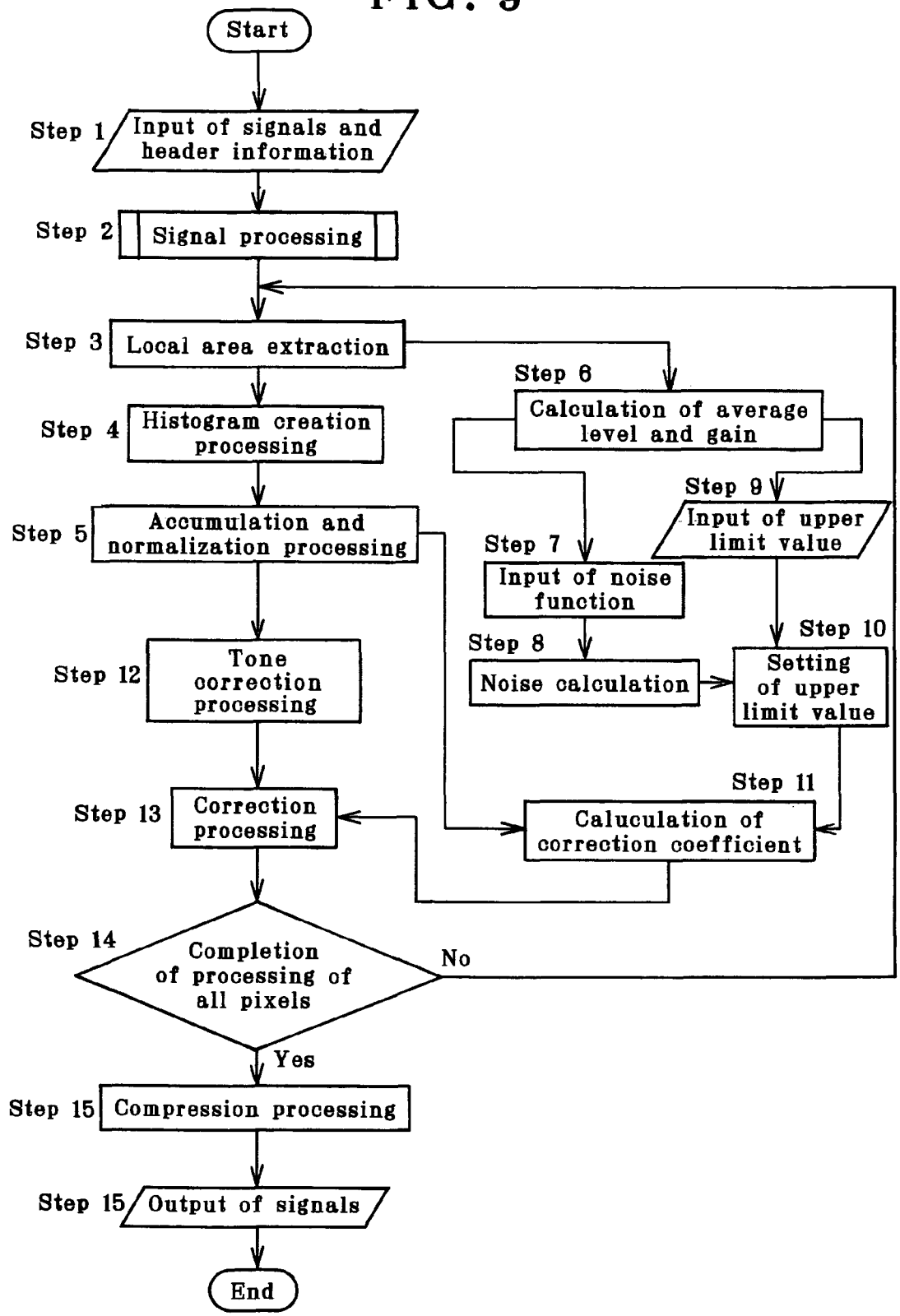
FIG. 9 is a flowchart of the first embodiment.

FIG. 1 shows one exemplary architecture of the first embodiment; FIG. 2 shows one exemplary architecture of the transformation block; FIG. 3 shows another exemplary architecture of the transformation block; FIG. 4 shows one exemplary architecture of the correction coefficient calculation block; FIG. 5 illustrates a function about the quantity of noise; FIG. 6 is graphically illustrative of a correction coefficient; FIG. 7 shows another exemplary architecture of the correction coefficient calculation block; FIG. 8 shows another exemplary architecture of the first embodiment; and FIG. 9 is a flowchart of tone correction in the first embodiment.

Referring first to FIG. 1, an image taken by way of a lens system 100, an aperture 101 and CCD 102 is converted at A/D 103 into digital signals. The signals from A/D 103 are forwarded to a signal processing block 108 via a buffer 104. Signals from the buffer 104 are also forwarded to a photometry estimation block 105 and a focusing detection block 106. The photometry estimation block 105 is connected to the aperture 101 and CCD 102. The signal processing block 108 is connected to an output block 114 by way of a local area extraction block 109, a transformation block 110, a correction block 111 and a compression block 113. The local area extraction block 109 and the transformation block 110 are connected to a correction coefficient calculation block 112 that is in turn connected to the correction block 111. A control block 115 such as a microcomputer is bidirectionally connected to A/D 103, the photometry estimation block 105, the focusing detection block 106, the signal processing block 108, the local area extraction block 109, the transformation block 110, the correction block 111, the correction coefficient calculation block 112, the compression block 113 and the output block 114. Further, an external I/F block 116 comprising a power source switch, a shutter button, a mode select interface, too, is bi-directionally connected to the control block 115.

The flow of signals in FIG. 1 is now explained. After taking conditions such as ISO sensitivity are set by way of the external I/F block 116, the shutter button is half pressed down to place the camera in a pre-image pickup mode. Image signals acquired by way of the lens system 100, the aperture 101 and CCD 102 are converted at A/D 103 into digital signals that are then forwarded to the buffer 104. Note here that an RGB primary-colors one-chip CCD is used for possible CCD 102 and the bit width of signals converted at A/D 103 is set at, say, 12 bits. Image signals within the buffer 104 are forwarded to the photometry estimation block 105 and the focusing detection block 106. At the photometry estimation block 105, the level of luminance in the image signals is calculated with the set ISO sensitivity, shake-limit shutter speed, etc. in mind, so that the aperture 101, the electronic shutter speed of CCD 102, etc. are controlled for proper exposure. At the focusing detection block 106, the edge intensity of image signals is detected to control an AF motor 107 in such a way as to maximize the edge intensity, thereby obtaining a focused image. Then, the shutter button is full pressed down by way of the external I/F block 116 to place the camera in a full-taking mode, with image signals forwarded to the buffer 104 as in the pre-image pickup mode.

Full-taking is implemented on the basis of the exposure condition calculated at the photometry estimation block 105 and the focusing condition calculated at the focusing detection block 106, and these taking conditions are forwarded to the control block 115. The image signals in the buffer 104 are forwarded to the signal processing block 108. On the basis of control at the control block 115, the signal processing block 108 reads single-chip state image signals on the buffer 104 and generates three primary-colors image signals subjected to interpolation processing, white balance processing, etc., all known in the art, which are then forwarded to the local area extraction block 109. The local area extraction block 109 here extracts a rectangular area of given size around a pixel of interest, for instance, a local area of 16×16 pixel unit. On the basis of control at the control block 115, the extracted local area is successively forwarded to the transformation block 110 and the correction coefficient calculation block 112. At the transformation block 110, a tone curve is set on the basis of a local area histogram for forwarding to the correction coefficient calculation block 112. The correction coefficient calculation block 112 estimates the quantity of noise in the pixel of interest and uses the predetermined upper limit value of the quantity of noise to find out the upper limit value of a gain with respect to each pixel of interest. Further at the correction coefficient calculation block 112, a gain with respect to each pixel of interest, generated by tone correction processing at the transformation block 110, is calculated to calculate a correction coefficient such that the gain by tone correction processing does not exceed that gain upper limit value.

That correction coefficient is forwarded to the correction block 111, after which tone correction processing is applied to the pixel of interest at the transformation block 110, with the result being forwarded to the correction block 111. On the basis of control at the control block 115, the correction block 111 uses the correction coefficient from the correction coefficient calculation block 112 to make correction of each pixel of interest from the transformation block 110, which has been subjected to tone correction processing. On the basis of control at the control block 115, the local area extraction block 109, the transformation block 110, the correction block 111 and the correction coefficient calculation block 112 operate in sync in each pixel unit. Image signals of each pixel of interest from the correction block 111 are forwarded to the compression block 113 until all image signals are in order, at which time they are subjected to known JPEG or other compression processing for transfer to the output block 114. At the output block 114, compressed signals are recorded and stored in a recording medium such as a memory card. Thus, in that recording medium, image signals to which a series of correction processing has been applied are recorded and held in a given file. In the embodiment of FIG. 1, the recording medium in which image signals subjected to tone correction are recorded comprises means for holding image signals subjected to calculation processing where a correction coefficient is calculated with respect to the pixel of interest of the image signals and its neighborhood area, transformation processing where tone correction processing is applied to the pixel of interest, and correction processing where the above correction coefficient is used to make correction of each pixel after the tone correction processing.

It is here noted that at the stage where the above correction coefficient is calculated, to what degree there is the degree of freedom of the gain with respect to tone correction is determined by comparison of it with a given threshold value. If the degree of freedom of the gain is judged to be little, it is then possible to avoid the tone correction processing of the pixel of interest at the transformation block 110 and the correction processing at the correction block 111, each under control at the control block 115; faster processing is achievable.

FIG. 2 is illustrative of one example of the architecture of the transformation block 110. The transformation block 110 comprises a buffer 300, a histogram creation block 301, a cumulative normalization block 302 and a tone correction block 303. The local area extraction block 109 is connected to the buffer 300 that is in turn connected to the histogram creation block 301 and the tone correction block 303. The histogram creation block 301 is connected to the cumulative normalization block 302 that is in turn connected to the correction coefficient calculation block 112 and the tone correction block 303 that is in turn connected to the correction block 111. The control block 115 is bidirectionally connected to the histogram creation block 301, the cumulative normalization block 302 and the tone correction block 303. Signals of a local area coming out of the local area extraction block 109 are stored in the buffer 300. The histogram creation block 301 creates a histogram for each local area for forwarding to the cumulative normalization block 302. At the cumulative normalization block 302, histograms are accumulated to create a cumulative histogram that is then normalized in association with the bit width to create a tone curve.

In the embodiment here, the bit width of image signals is assumed to be 12 bits; the above tone curve comes to have a 12-bit input and a 12-bit output. That tone curve is forwarded to the correction coefficient calculation block 112 and the tone correction block 303. On the basis of the tone curve from the cumulative normalization block 302, the tone correction block 303 applies tone correction processing to the pixel of interest in a local area on the buffer 300, after which segmentation processing is applied in such a way as to fit in with a bit width upon output. Given 8 bits here, signals of an 8-bit area are forwarded to the correction block 111. While a histogram-based tone curve is here calculated for each local area, it is understood that the present invention is not necessarily limited thereto. For instance, it is acceptable to use a standard tone curve in a fixed manner, as shown in FIG. 3.

FIG. 3 is illustrative of one example of the architecture of the transformation block 110 shown in FIG. 2, from which the histogram creation block 301 and the cumulative normalization block 302 are removed and instead, to which a standard tone curve ROM 350 is added. A basic architecture is equivalent to that of the transformation block 110 shown in FIG. 2, and the same components or parts are indicated by the same reference numerals and the same names. In what follows, only what is different from FIG. 2 is explained. A buffer 300 is connected to a tone correction block 303, and a standard tone curve ROM 350 is connected to a correction coefficient calculation block 112 and a tone correction block 303. In this arrangement, the correction coefficient calculation block 112 reads a standard tone curve from the standard tone curve ROM 350, applying tone correction processing to signals in an area on the buffer 300. In this case, although the effects on improvements become tenuous in high-contrast scenes, yet faster processing is achievable.

FIG. 4 is illustrative of one example of the architecture of the correction coefficient calculation block 112. The correction coefficient calculation block 112 is built up of an average calculation block 400, a gain calculation block 401, a noise calculation block 402, a noise function ROM 403, an upper limit value setting block 404, an upper limit value ROM 405, an upper limit gain calculation block 406 and a coefficient calculation block 407 The local area extraction block 109 is connected to the average calculation block 400 that is in turn connected to the noise calculation block 402 and the upper limit value setting block 404. The gain calculation block 401 and the noise function block ROM 403 are connected to the noise calculation block 402, and the upper limit value ROM 405 is connected to the upper limit value setting block 404. The noise calculation block 402 and the upper limit value setting block 404 are connected to the upper limit gain calculation block 406 that is in turn connected to the coefficient calculation block 407 that is in turn connected to the correction block 111. The transformation block 110 is connected to the coefficient calculation block 407 The control block 115 is bidirectionally connected to the average calculation block 400, the gain calculation block 401, the noise calculation block 402, the upper limit value setting block 404, the upper limit gain calculation block 406 and the coefficient calculation block 407

On the basis of control at the control block 115, the average calculation block 400 reads signals of a local area out of the local area extraction block 109 to calculate an average $AV_c$ (c=R, G, B) for each color signal, say, for each of three RGB color signals, forwarding it to the noise calculation block 402 and the upper limit value setting block 404. On the basis of information about exposure conditions such as ISO sensitivity, transmitted from the control block 115, the gain calculation block 401 calculates a gain with respect to image signals, forwarding it to the noise calculation block 402. On the basis of a function about the quantity of noise, the noise calculation block 402 estimates the quantity of noise in each color signal.

FIG. 5 is graphically illustrative of the function about the quantity of noise. A signal level vs. noise quantity plot of FIG. 5 may be approximated in terms of a power function. Now let a signal level be the above average $AV_c$. Then, noise quantity $N_c$ may be formulated by formula (1):

$$N_c = \alpha_c AV_c^{\beta_c} + Y_c \tag{1}$$

Here, $\alpha_c$, $\beta_c$ and $Y_c$ are each a constant term. However, the noise quantity changes with not only signal levels but also gains with respect to signals.

In FIG. 5, there are noise quantities plotted at three ISOs, say, ISO=100, ISO=200 and ISO=400. Individual curves take the forms represented by formula (1), but their coefficients differ with ISO sensitivity. With ISO sensitive as i (i=100, 200, 400) and with the foregoing in mind, formulation gives $$N_c = \alpha_{ci} AV_c^{\beta_{ci}} + Y_{ci} \tag{2}$$

In the noise function ROM 403, there are three coefficients shown in formula (2), $\alpha_{ci}$, $\beta_{ci}$ and $Y_{ci}$, recorded per color signal and ISO sensitivity. On the basis of control at the control block 115, the noise calculation block 402 reads three such coefficients about associated color signals and ISO sensitivities out of the noise function ROM 403, making estimation of the quantity $N_c$ of noise in each of the RGB color signals based on formula (2). The estimated noise quantity $N_c$ is forwarded to the upper limit gain calculation block 406. On the other hand, the upper limit value setting block 404 reads a subjectively allowable noise quantity out of the upper limit value ROM 405. An upper limit value Limit_$N_c$ of the allowable noise quantity is recorded in the upper limit value ROM 405 in the form of a table with respect to the signal level $AV_c$, as is the case with a noise quantity model shown in FIG. 5, and determined in advance as by subjective estimation experimentation.

Alternatively, as a simpler upper limit value $Limit_{13} N_c$ of the noise quantity, a noise model for a specific ISO sensitivity may be used, in which case cost reductions may be achievable because of dispensing with the upper limit value ROM 405 and being capable of reading that ISO sensitivity out of the noise function ROM 403. The upper limit value Limit_$N_c$ of the noise quantity is forwarded to the upper limit gain calculation block 406. At the upper limit gain calculation block 406, formula (3) is used to calculate an upper limit gain Limit_gain that may be applied to image signals from the noise quantity N, out of the noise calculation block 402 and the upper limit value $Limit_{13} N_c$ of the noise quantity out of the upper limit value setting block 404.

$$\text{Limit\_gain}_c = \frac{\text{Limit\_N}_c}{N_c} \tag{3}$$

Figure 6A:
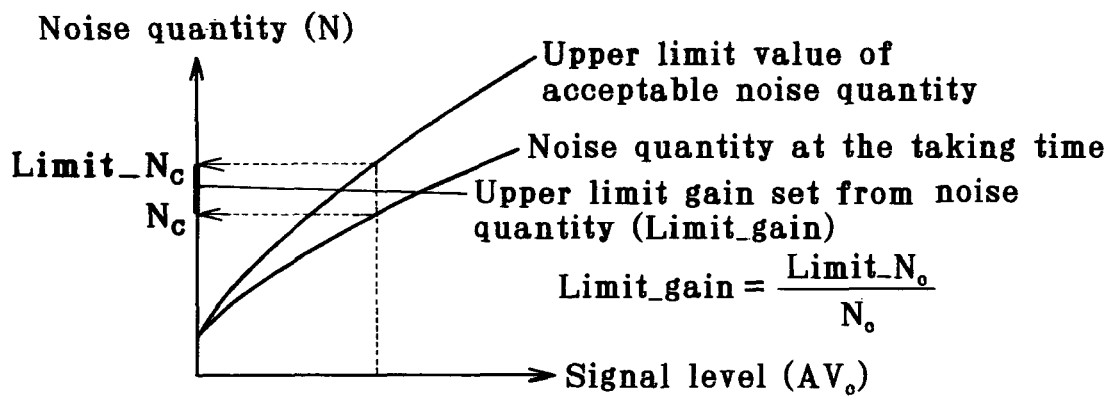
FIG. 6 is graphically representative of the correction coefficient.
Figure 6B:
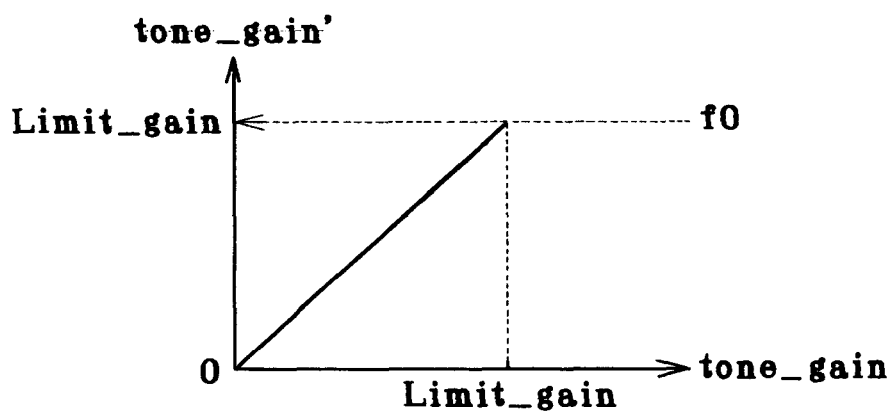
Figure 6C:
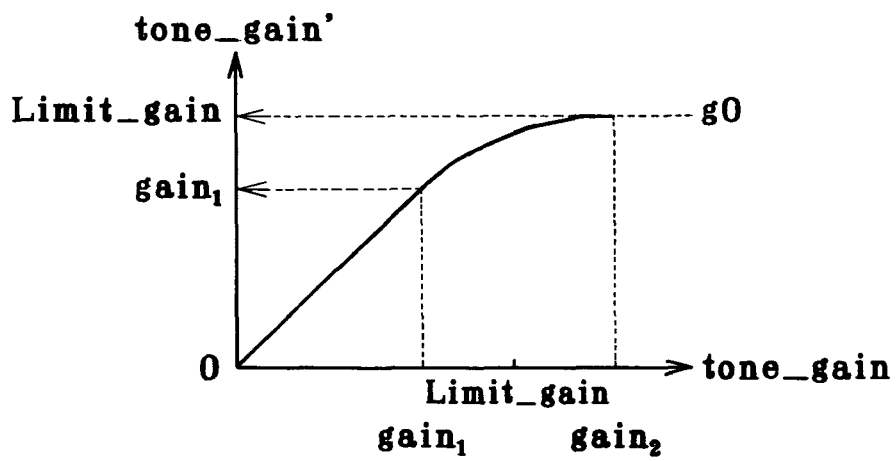

FIG. 6(a) is illustrative of the upper limit gain Limit_gain represented by formula (3). From the ratio between the noise quantity upon taking and the subjectively allowable noise quantity, the upper limit gain that may be applied to image signals is calculated. The upper limit gain represented by formula (3) here is calculated for each color signal, say, in three for RGB. Of the gain values, the least is selected and forwarded as the upper gain Limit-gain to the coefficient calculation block 407 This is to make selection on the basis of a signal without the artifact of noise, thereby implementing tone correction processing without artifacts by noise. At the coefficient calculation block 407, a correction coefficient $k_c$ is calculated from the upper limit gain out of the upper limit gain calculation block 406 and the tone curve out of the transformation block 110. However, it is beforehand required to find out what degree of a gain is generated with respect to an area signal by tone correction processing at the transformation block 110. Now let t( ) be a tone curve, $AV_c$ be an input signal level, and tone_gain be a gain generated by tone correction processing. Then, the gain is calculated from formula (4).

$$\text{tone\_gain} = \frac{t(AV_c)}{AV_c} \qquad (4)$$

The correction coefficient $k_c$ is given by formula (5).

$$k_c = \text{Limit\_gain}/\text{tone\_gain}_c \text{ if } \text{Limit\_gain} < \text{tone\_gain}_c, k_c = 1 \text{ if } \text{Limit\_gain} \geq \text{tone\_gain}_c \qquad (5)$$

That correction coefficient $k_c$ is forwarded to the correction block 111. FIG. 6(*b*) is representative of characteristics f( ) at a time when, by multiplication by the correction coefficient $k_c$, the gain tone$_{13}$ gain generated by tone correction processing is corrected to tone_gain'. With the correction coefficient $k_c$, when the upper limit gain Limit_gain is not reached, the tone_gain generated by tone correction processing is produced as such. When the upper limit gain Limit_gain is exceeded, the gain tone_gain is replaced by Limit_gain. Note here that the present invention is not necessarily limited to such characteristics f( ); for instance, such continuously changing characteristics g( ) as shown typically in FIG. 6(*c*) may be applied. The characteristics g( ) are such that the same gain as that of an input is produced as long as the gain tone_gain generated by tone correction processing is 0 to gain$_1$; it is non-linearly compressed to gain$_1$ to Limit_gain as long as gain$_1$ to gain$_2$; and it is replaced by Limit_gain upon exceeding gain$_2$. Gain$_1$ and gain$_2$ here are each a threshold value comprising a given constant, and gain$_1$<Limit_gain<gain$_2$. Those characteristics bring on improvements in the reproducibility of gradation because all gains exceeding the upper limit gain Limit_gain are not replaced by that.

It is here noted that while the above correction coefficient calculation block 112 is configured in such a way as to calculate the correction coefficient based on the noise quantity, the present invention is not limited to such configuration. For instance, it is also possible to calculate the correction coefficient on the basis of the proportion of subjectively important specific colors called memory colors like sky blue and flesh color, as shown in FIG. 7.

FIG. 7 is illustrative of another example of the architecture of the correction coefficient calculation block 112. The correction coefficient calculation block 112 is built up of a Y/C separation block 450, a hue saturation calculation block 451, a specific color extraction block 452, a specific color ROM 453, a buffer 454, an occupied factor calculation block 455, an upper limit gain setting block 456, an upper limit value ROM 457, an average calculation block 458 and a coefficient calculation block 459. The local area extraction block 109 is connected to the Y/C separation block 450 and the average calculation block 458; the Y/C separation block 450 is connected to the hue saturation calculation block 451 and the specific color extraction block 452; and the hue saturation block 451 is connected to the specific color extraction block 452. The specific color extraction block 452 is connected to the correction block 111 by way of the buffer 454, the occupied factor calculation block 455, the upper limit gain setting block 456 and the coefficient calculation block 459. The specific color ROM 453 is connected to the specific color extraction block 452, and the upper limit value ROM 457 is connected to the upper limit gain setting block 456. The transformation block 110 and the average calculation block 458 are connected to the coefficient calculation block 459. The control block 115 is bidirectionally connected to the Y/C separation block 450, the hue saturation calculation block 451, the specific color extraction block 452, the occupied factor calculation block 455, the upper limit gain setting block 456, the average calculation block 458, and the coefficient calculation block 459.

On the basis of control at the control block 115, the Y/C separation block 450 reads an area signal from the local area extraction block 109 to calculate a luminance signal Y and color difference signals Cb, Cr represented by formulae (12) and (13). The luminance signal Y and the color difference signals Cb, Cr are forwarded to the hue saturation calculation block 451 and the specific color extraction block 452. At the hue saturation calculation block 451, a hue signal H represented by formula (14) and a saturation signal C represented by formula (6) are calculated for transfer to the specific color extraction block 452.

$$c = (cb \cdot Cb + Cr \cdot Cr)^{1/2} \qquad (6)$$

On the basis of the luminance signal from the Y/C separation block 450 and the hue signal H and saturation signal C from the hue saturation calculation block 451, the specific color extraction block 452 extracts specific colors such as flesh color and sky blue. With the range of the luminance signal Y, hue signal H and saturation signal C set in advance, the specific colors are recorded in the specific color ROM 453. The specific color extraction block 452 reads the range of the luminance signal Y, hue signal H and saturation signal C from the specific color ROM 453 to extract the specific colors in pixel unit, forwarding them to the buffer 454 after labeling. Labels about specific colors may be in an identifiable form the way flesh color is 1, sky blue is 2, and other colors are 0. After the completion of extraction at the specific color extraction block 452, the occupied factor calculation block 455 calculates, on the basis of control at the control block 115, an occupied factor of how many specific color pixels on the buffer 454 are included in all pixels in a local area. When there are no specific colors, the occupied factor becomes 0%. Note here that when there are two or more specific colors in one single local area, the occupied factor of the most outnumbered specific color is chosen. The above specific color and its occupied factor are forwarded to the upper limit gain setting block 456, where the occupied factor from the occupied factor calculation block 455 is compared with a given threshold value, for instance, 40%, and only when the threshold value is exceeded, the upper limit gain Limit_gain is read out of the upper limit value ROM 457.

Set on the basis of subjective estimation for each specific color, the upper limit gain Limit_gain is recorded in the upper limit value ROM 457. The upper limit gain Limit_gain is forwarded to the coefficient calculation block 459. On the basis of control at the control block 115, the average calculation block 458 reads an area signal from the local area extraction block 109 to calculate an average value $AV_c$ of each color signal, forwarding it the coefficient calculation block 459. When upper limit gain Limit_gain is transferred from the coefficient calculation block 456 under control at the control block 115, the coefficient calculation block 459 calculates, on the basis of the average value $AV_c$ from the average calculation block 458 and the tone curve from the transformation block 110, the correction coefficient $k_c$ as represented by formulae (4) and (5). When there is no transfer of the upper limit gain Limit$_{13}$ gain from the upper limit gain setting block 456, the correction coefficient $k_c$ is set at $k_c$=1. This correction coefficient $k_c$ is forwarded to the correction block 111.

With the above arrangement, it is possible to obtain high-definition image signals even in high-contrast scenes while artifacts such as increased noise components and a failure of color reproduction are suppressed. The tone correction processing takes a form having the same construction as in the prior art yet with the addition of correction processing thereto, and so it is easily implemented on an existing system because of having good compatibility therewith. The tone curve, because of being set on the basis of a histogram, ensures adaptive tone correction processing even in a variety of scenes. If the standard tone curve is set in a fixed fashion, faster processing is then achievable. Further, because there is limitation imposed on tone correction processing on the basis of the quantity of noise, allowable noise is reduced down to less than its upper limit value. Limitation on tone correction processing is imposed on the basis of the occupied factor of a specific color, so that the quantity of noise about a subjectively important specific color can be reduced down to less than its upper limit value.

In the aforesaid embodiments, image signal processing is configured in such a way as to be integral with an image pickup unit comprising the lens system 100, aperture 101, CCD 102 and A/D 103; however, the present invention is not limited to such configuration. As shown in FIG. 8 as an example, image signals acquired in a separate image pickup unit may be processed in a raw data form, or further from a recording medium such as a memory card with incidental information such as image pickup conditions recorded in a header.

FIG. 8 is illustrative of the architecture of FIG. 1, from which the lens system 100, the aperture 101, CCD 102, A/D 103, the photometry estimation block 105, the focusing detection block 106 and the AF motor 107 are omitted but with the addition of an input block 500 and a header information analysis block 501. Basic configuration is equivalent to that of FIG. 1, and the same components or parts are indicated by the same names and numerals. In what follows, only what is different from FIG. 1 is explained. The input block 500 is connected to the buffer 104 and the header information analysis block 501. The control block 115 is bidirectionally connected to the input block 500 and the header information analysis block 501. Upon start of reproduction operation via the external I/F block 116 such as a mouse or keyboard, signals and header information stored in a recording medium such as a memory card are read out of the input block 500. Signals from the input block 500 are forwarded to the buffer 104, and the header information is forwarded to the header information analysis block 501. At the header information analysis block 501, taking information is extracted from the header information for transfer to the control block 115. The rest of processing is equivalent to that of FIG. 1.

The above embodiment is assumed to run on hardware; however, the present invention is not necessarily limited thereto. For instance, signals from CCD 102 may be produced as outputs in an unprocessed raw data form, and taking information from the control block 115 may be produced as header information outputs for running on separate software. FIG. 9 is a flowchart of tone correction processing on software in the first embodiment of the invention. At Step 1, unprocessed image signals and header information including incidental information such as taking conditions are read. At Step 2, signal processing such as interpolation processing and white balance processing, all known in the art, is implemented. At Step 3, local areas around a pixel of interest, for instance, local areas in 16×16 pixel unit, are sequentially extracted. At Step 4, a local area histogram is created. At Step 5, the histogram is accumulated and normalized into a tone curve. The tone curve is forwarded to Step 11 and Step 12. At step 6, each color signal average value $Av_c$ (c=R, G, B) and ISO sensitivity information are calculated.

At Step 7, three coefficients ($\alpha_{ci}$, $\beta_{ci}$ and $Y_{ci}$ are read for each color signal and ISO sensitivity, as represented by formula (2). At Step 8, the noise quantity $N_c$ of each color signal is estimated on the basis of formula (2) to forward it to Step 10. At Step 9, the upper limit value Limit_$N_c$ of a subjectively allowable noise quantity is read and set, as shown in FIG. 6(*a*). At Step 10, based on the noise quantity $N_c$ transmitted from Step 8 and the upper limit value Limit_$N_c$ transmitted from Step 9, the upper limit gain $Limit_{13}$ gain that may be applied to image signals is calculated, as represented by formula (3). At Step 11, based on the tone curve transmitted from Step 5 and the upper limit gain $Limit_{13}$ gain transmitted from Step 10, such a correction coefficient $k_c$ as represented by formulae (4) and (5) is calculated. At Step 12, based on the tone curve transmitted from Step 5, tone correction processing is applied to the pixel of interest. At Step 13, correction is implemented by multiplication by the correction coefficient $k_c$ transmitted from Step 11. At Step 14, whether or not processing of all pixels is over is determined. If not, Step 3 is resumed, and if yes, Step 15 takes over. At Step 15, compression processing such as known JPEG is implemented. At Step 16, post-processing signals are produced as outputs to finish the whole processing.

Figure 10:
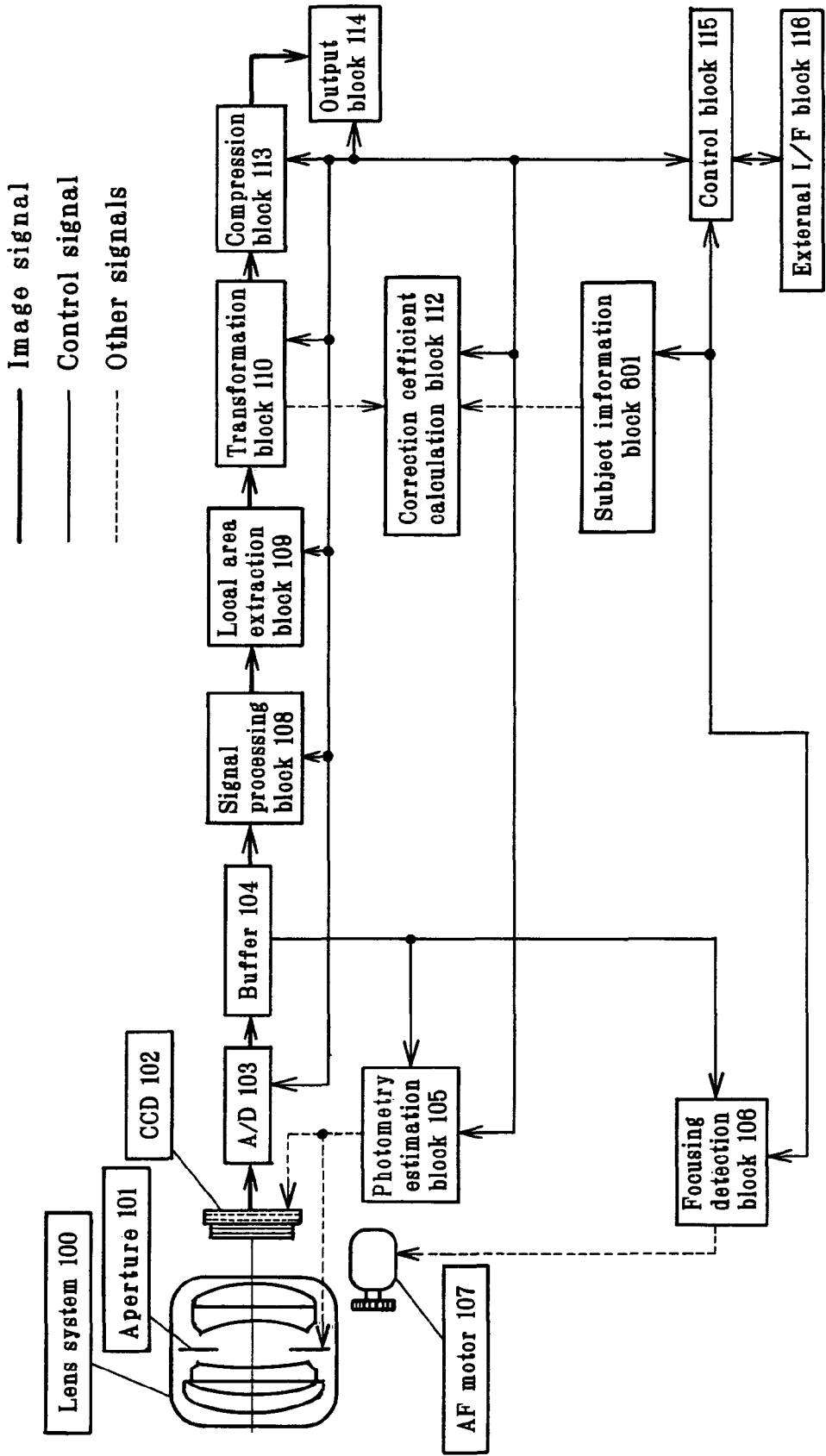
FIG. 10 is illustrative of the architecture of the second embodiment.
Figure 11:
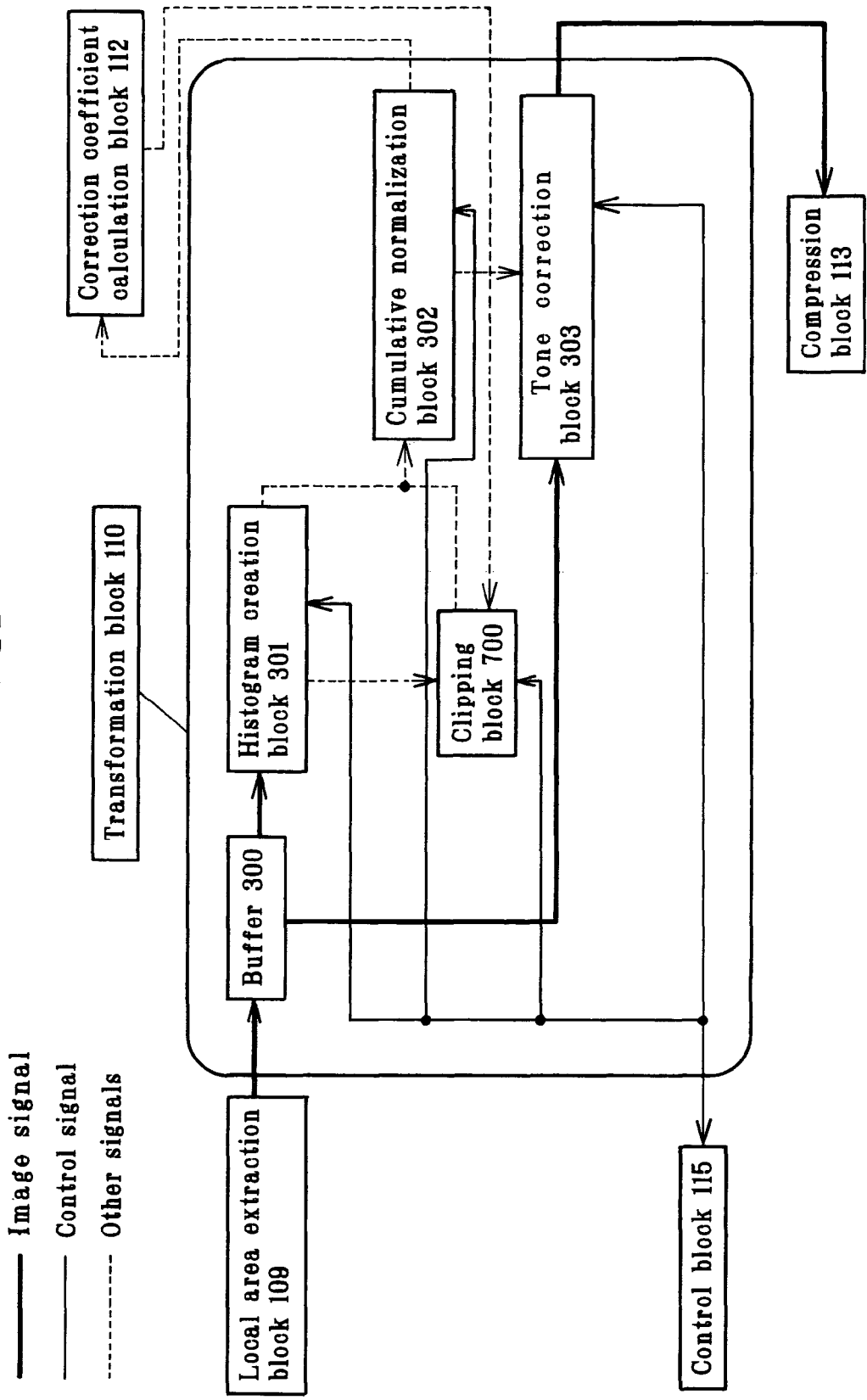
FIG. 11 is illustrative of the transformation block in the second embodiment.
Figure 14:
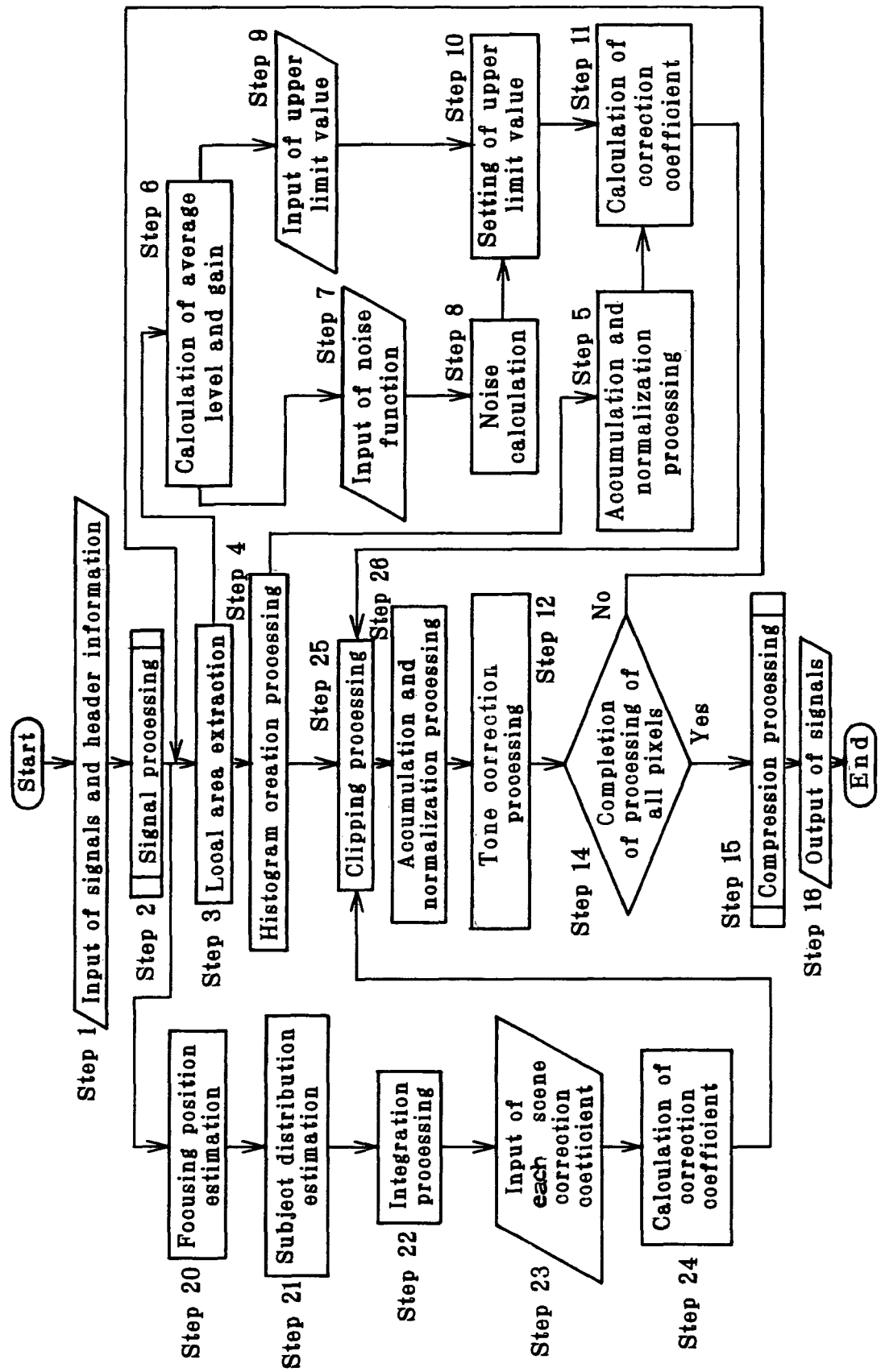
FIG. 14 is a flowchart of the second embodiment.

The second embodiment of the present invention is now explained. FIG. 10 is illustrative of the architecture of the second embodiment; FIG. 11 is illustrative of the architecture of the transformation block; FIG. 12 is illustrative of clipping processing; FIG. 13 is illustrative of the subject information block; and FIG. 14 is a flowchart of tone correction processing in the second embodiment.

FIG. 10 is illustrative of the architecture of the first embodiment shown in FIG. 1, from which the correction block 111 is removed yet with the addition of a subject information block 601 to it. Basic configuration is equivalent to the first embodiment of the invention, and the same components or parts are indicated by the same names and numerals. In what follows, only what is different from FIG. 1 is explained. The transformation block 110 is connected to the compression block 113, and the subject information block 601 is connected to the correction coefficient calculation block 112. The transformation block 110 and the correction coefficient calculation block 112 are bidirectionally connected to each other. The control block 115 is bidirectionally connected to the subject information block 601.

The operation of the second embodiment is basically equivalent to that of the first embodiment, and so only what differs is explained. Referring to FIG. 10, how signals flow is explained. A three primary-colors image signal, to which known interpolation processing, white balance processing or the like has been applied at the signal processing block 108, is forwarded to the local area extraction block 109. At the transformation block 110, on the basis of control at the control block 115, the first round tone curve is calculated of a local area histogram for transfer to the correction coefficient calculation block 112 that in turn calculates a correction coefficient $k_c$ (c=R, G, B) for a pixel of interest, as in the first embodiment. At the subject information block 601, on the other hand, subject information on landscapes, portraits and close-ups is estimated based on exposure conditions calculated at the photometry estimation block 105 and focusing conditions calculated at the focusing detection block 106 under control at the control block 115 to set the second correction coefficient k' based on that subject information. Although the correction coefficient $k_c$ at that correction coefficient calculation block 112 is calculated in pixel unit, the second correction coefficient k' at the subject information block 601 is calculated only once for an image signal.

That second correction coefficient is forwarded to the correction coefficient calculation block 112. At the correction coefficient block 112, the least of the previously calculated correction coefficient $k_c$ is multiplied by the second correction coefficient k' calculated at the subject information block 601, thereby calculating the correction coefficient k from formula (7).

$$k=\min(k_c) \cdot k' \tag{7}$$

In formula (7), min( ) stands for a function with which the minimum value is obtained. That correction coefficient k is forwarded to the transformation block 110. At the transformation block 110, on the basis of the correction coefficient k from the correction coefficient calculation block 112, clipping processing is applied to the local area histogram to calculate the second round tone curve, with which tone correction processing is applied to the pixel of interest, with the result being forwarded to the compression block 113. On the basis of control at the control block 115, the transformation block 110 and the correction coefficient calculation block 112 implement processing in sync with each other in each pixel unit.

At an output block 114, there are compression signals recorded and stored in a recording medium such as a memory card. In the embodiment of FIG. 10, too, image signals subjected to such a series of correction processing as described above are supposed to be recorded and held in a given file in the recording medium. In the embodiment of FIG. 10, the recording medium, in which an image signal for tone correction is to be recorded, comprises a means for holding image signal data subjected to calculation processing for calculating a correction coefficient for the pixel of interest in that image signal and an area near it as well as transformation processing for implementation of tone correction processing of that pixel of interest using that correction coefficient. It is here noted that at the stage of calculation of that correction coefficient, to what extent the degree of freedom of the gain is allowed with respect to tone correction is judged by comparison with a given threshold value. When the degree of freedom of the gain is judged to be little, faster processing may be achieved by avoiding the calculation of the second round tone curve and tone correction processing that occur at the transformation block 110 under control at the control block 115.

FIG. 11 is illustrative of one example of the architecture of the transformation block 110. In the transformation block 110 of FIG. 11, a clipping block 700 is added to the architecture of the transformation block 110 of the first embodiment shown in FIG. 2. Basic configuration is equivalent to that of the transformation block 110 shown in FIG. 2, and the same components or parts are indicated by the same names and numerals. Only what differs from FIG. 2 is now explained. The histogram creation block 301 is connected to the clipping block 700 that is in turn connected to the cumulative normalization block 302. The control block 115 is bidirectionally connected to the clipping block 700. Local area signals transmitted from the local area extraction block 109 are stored in the buffer 300. The histogram creation block 301 creates a histogram for each local area to forward it a cumulative normalization block 302, at which histograms are accumulated to create a cumulative histogram that is then normalized with a bit width to generate the first round tone curve. That tone curve is forwarded to the correction coefficient calculation block 112 that then calculates the aforesaid correction coefficient k to forward it to the clipping block 700.

Figure 12A:
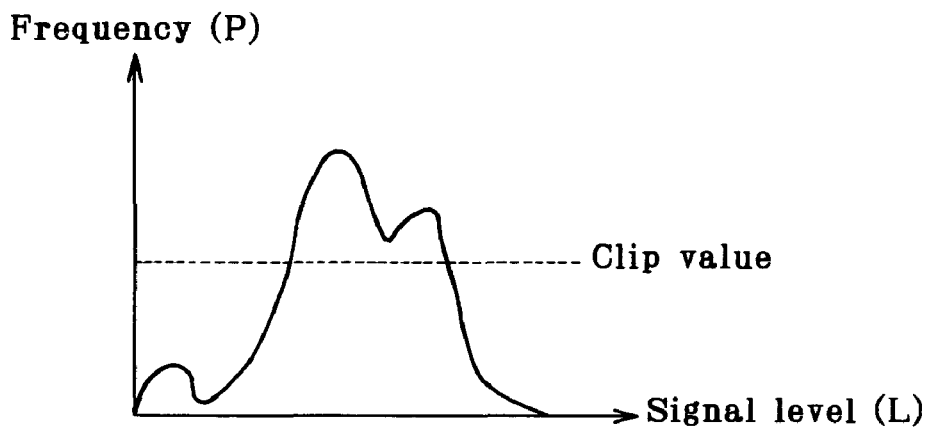
FIG. 12 is illustrative of clipping processing.
Figure 12B:
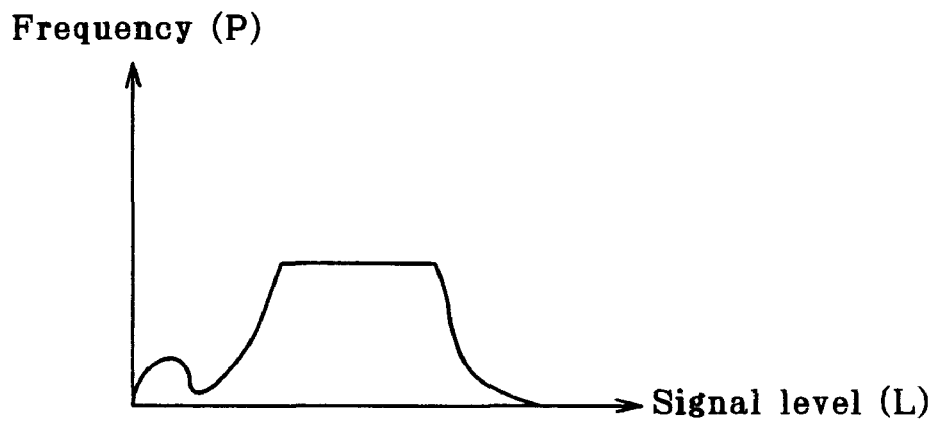
Figure 12C:
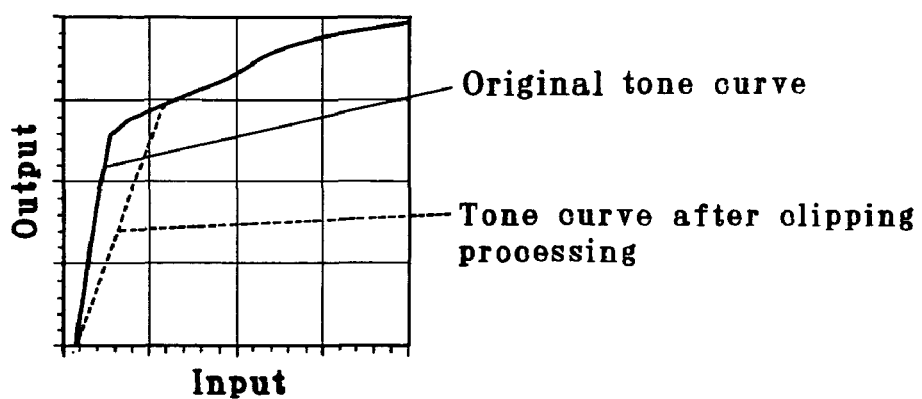

At the clipping block 700, clipping processing is applied to the histogram from the histogram creation block 301. FIG. 12 is representative of clipping processing: FIG. 12(a) shows an original histogram from the histogram creation block 301 and a clip value with respect to frequency on ordinate; FIG. 12(b) shows a histogram in which a frequency greater than the clip value is replaced by the clip value by clipping processing; and FIG. 12(c) shows a tone curve obtained by the accumulation and normalization of the original histogram and a post-clipping histogram. Clipping processing permits the frequency to be so reduced that the slope of the tone curve is relaxed. A tight slope causes gains to increase with respect to signals, offering problems such as artifacts like noises. As the clip value in clipping processing is kept low, it allows gains to become low with respect to signals, and as kept high, it allows gains to grow high with respect to signals. In the embodiment here, the clip value Clip is calculated from formula (8).

$$\text{Clip}=w \cdot No \cdot k \tag{8}$$

In formula (8), w stand for a given weight coefficient and No is the total number of pixels in an area. The post-clipping histogram is forwarded to the cumulative normalization block 302 to generate the second round tone curve that is in turn forwarded to a tone correction block 303 for application of tone correction processing to the pixel of interest.

FIG. 13(a) is illustrative of one example of the architecture of the subject information block 601 that is made up of a focusing position estimation block 800, a subject distribution estimation block 801, an integration block 802, a second coefficient setting block 803 and a each scene correction coefficient ROM 804. The focusing position estimation block 800 and the subject distribution estimation block 801 are connected to the integration block 802 that is in turn connected to the correction coefficient calculation block 112 by way of the second coefficient setting block 803. The each scene correction coefficient ROM 804 is connected to the second coefficient setting block 803, and the control block 115 is bidirectionally connected to the focusing position estimation block 800, the subject distribution estimation block 801, the integration block 802 and the second coefficient setting block 803. At the focusing position estimation block 800, information about the focusing distance of the focusing detection block 106 is obtained by way of the control block 115. Based on that focusing distance, there are three categories, for instance, a scene (greater than 5 m) category, a portrait (1 m to 5 m) category, and a close-up (less than 1 m) category that are forwarded as focusing information to the integration block 802. On the other hand, the subject distribution estimation block 801 acquires information about photometry estimation by way of the control block 115.

FIG. 13(a) is illustrative of one example of a divided pattern for photometry estimation, which pattern is divided into 13 areas to obtain a luminance value ($a_i$, i=1 to 13) of each area. The subject distribution estimation block 801 calculates the following parameters from the luminance value $a_i$ of each area.

$$S_1=|a_2-a_3| \tag{9}$$

$$S_2=\max(|a_4-a_6|, |a_4-a_7|) \tag{10}$$

$$S_3=\max(a_{10}-a_{11})-\Sigma a_i/13 \tag{11}$$

Here, | | stands for an absolute value and max ( ) means a function with which the maximum value is obtained. $S_1$ is provided to find a difference between the left and the right area in the middle portion of the pattern; for close-ups, the value of S1 becomes small when a single object is taken, and grows large when two or more objects are taken. Selected for $S_2$ is a larger one of differences between the left and the center area and the center and the right area just above the middle portion; for portraits, the value of $S_2$ becomes small when two or more figures are taken, and grows large when one figure is taken. $S_3$ is provided to calculate a difference between the uppermost left and right areas and an average value of the 13 areas; for scenic shots, the value of $S_3$ becomes small when there is no sky above the background, and grows large when there is the sky. At the subject distribution estimation block 801, there is such photometry information calculated for transmission to the integration block 802, at which there is a taking situation estimated on the basis of focusing information and photometry information.

FIG. 13(c) is a table for how to estimate 6 taking situations from focusing information and photometry information. When there is the scene category chosen from the focusing information, it is broken down into type$_1$ (scene with the sky) and type$_2$ (scene with no sky) by comparing the parameter $S_3$ of the photometry information with a given threshold value Th$_1$; when there is the portrait category chosen from the focusing information, it is broken down into type$_3$ (portrait of one figure) and type$_4$ (portrait of two or more) by comparing the parameter $S_2$ of the photometry information with a given threshold value Th$_2$; and when there is the close-up category chosen from the focusing information, it is broken down into type$_5$ (close-up of one single object) and type$_6$ (close-up of two or more objects) by comparing the parameter $S_1$ of the photometry information with a given threshold value Th$_3$. At the integration block 803, 6 such taking situations are forwarded to the second coefficient setting block 803.

For the 6 taking situations, the second coefficient setting block 803 reads the second correction coefficient k' out of the each scene correction coefficient ROM 804 for transmission to the correction coefficient calculation block 112. The second correction coefficient k' is set based on subjective estimation. As shown typically in FIG. 13(c), the second correction coefficient k' is set at a lower value for a subject sensitive to noise components such as the skin or the sky, and at a higher value for other subjects.

With the aforesaid arrangement, high-definition image signals are obtained even in scenes having high contrast while artifacts such as increased noise components or a failure of color reproduction are suppressed. Because tone correction processing is integrated with the setting of tone correction constraints, it is possible to achieve low-cost installations. Further, because taking scenes are estimated to find out the correction coefficient, it is possible to gain control for each taking scene and, hence, obtain high-definition image signals. Furthermore, because the above correction coefficient is calculated only once for each single-chip image signal, faster processing is achievable. While the embodiment here has been described with reference to a primary-colors type of single chip CCD, it is understood that the invention may be applied to, for instance, a complementary color type of single chip CCD as well as a 2- or 3-chip CCD.

The above embodiment is assumed to run on hardware; however, the present invention is not necessarily limited thereto. For instance, signals from CCD 102 may be produced as outputs in an unprocessed raw data form, and taking information from the control block 115 may be produced as header information outputs for running on separate software. FIG. 14 is a flowchart of tone correction processing on software in the second embodiment of the invention. Note here that to the same processing steps as in the flowchart of the tone correction processing according to the first embodiment of the invention shown in FIG. 9, as many as steps are assigned.

At Step 1, unprocessed image signals and header information including incidental information such as taking conditions are read. At Step 2, signal processing such as interpolation processing and white balance processing, all known in the art, is implemented. At Step 20, on the basis of focusing distance, the focusing position is classified according to three types, say, into scenes, portraits and close-ups. At Step 21, a subject distribution concerning one single subject, two or more subjects, and the presence or absence of the sky are estimated on the basis of photometry estimation. At Step 22, the aforesaid focusing position and subject distribution are integrated to classify them into, for instance, the 6 types shown in FIG. 13(c). At Step 23, a each scene correction coefficient is read. At Step 24, the second correction coefficient k' is selected on the basis of the type of scene estimated at Step 22. At Step 3, local areas around a pixel of interest are sequentially extracted. At Step 4, a local area histogram is created. At Step 5, histograms are accumulated and normalized into the first round tone curve. The tone curve is forwarded to Step 11. At step 6, each color signal average value $AV_c$ (c=R, G, B) and ISO sensitivity information are calculated. At Step 7, three coefficients ($\alpha_{ci}$, $\beta_{ci}$ and $Y_{ci}$ are read for each color signal and ISO sensitivity, as represented by formula (2). At Step 8, the noise quantity $N_c$ of each color signal is estimated on the basis of formula (2) to forward it to Step 10.

At Step 9, the upper limit value Limit_$N_c$ of a subjectively allowable noise quantity is read and set, as shown in FIG. 6(a). At Step 10, based on the noise quantity $N_c$ transmitted from Step 8 and the upper limit value Limit_$N_c$ transmitted from Step 9, the upper limit gain Limit_gain that may be applied to image signals is calculated, as represented by formula (6). At Step 11, based on the tone curve transmitted from Step 5 and the upper limit gain Limit_gain transmitted from Step 10, such a correction coefficient $k_c$ as represented by formulae (4) and (5) is calculated. At Step 25, on the basis of the second correction coefficient k' transmitted from the Step 24 and the correction coefficient $k_c$ transmitted from Step 11, the correction coefficient k is calculated, as represented by formula (7). Further, upon finding out the clip value Clip as represented by formula (8), clipping processing is applied to the histogram transmitted from Step 4. At Step 26, the histograms are accumulated and normalized into the second tone curve. At Step 12, based on the tone curve transmitted from Step 26, tone correction processing is applied to a pixel of interest. At Step 14, whether or not processing of all pixels has been over is determined. If not, Step 3 is resumed, and if yes, Step 15 takes over. At Step 15, compression processing such as known JPEG is implemented. At Step 16, post-processing signals are produced as outputs to finish the whole processing.

Figure 15:
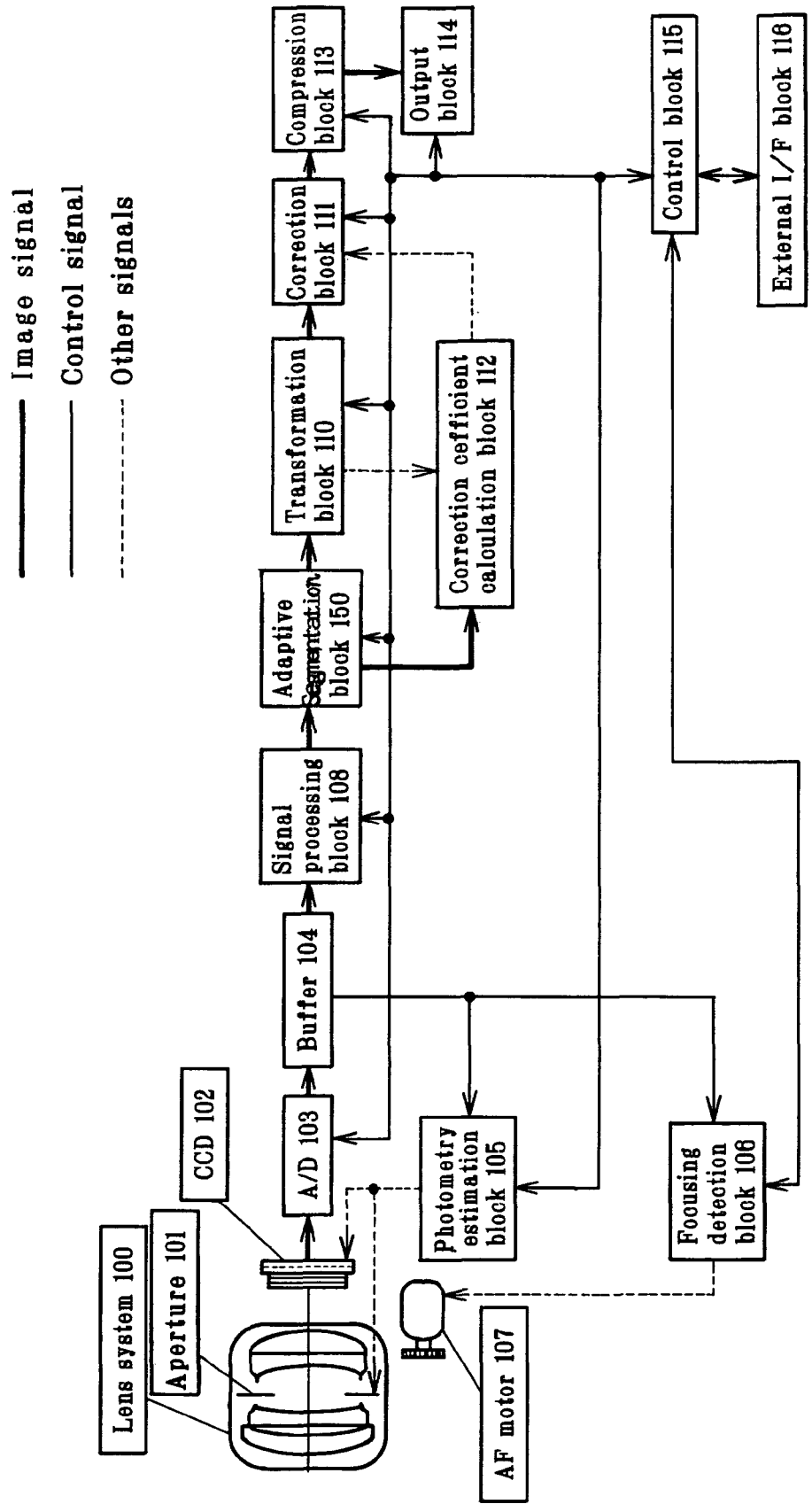
FIG. 15 is illustrative of the architecture of the third embodiment of the invention.
Figure 16:
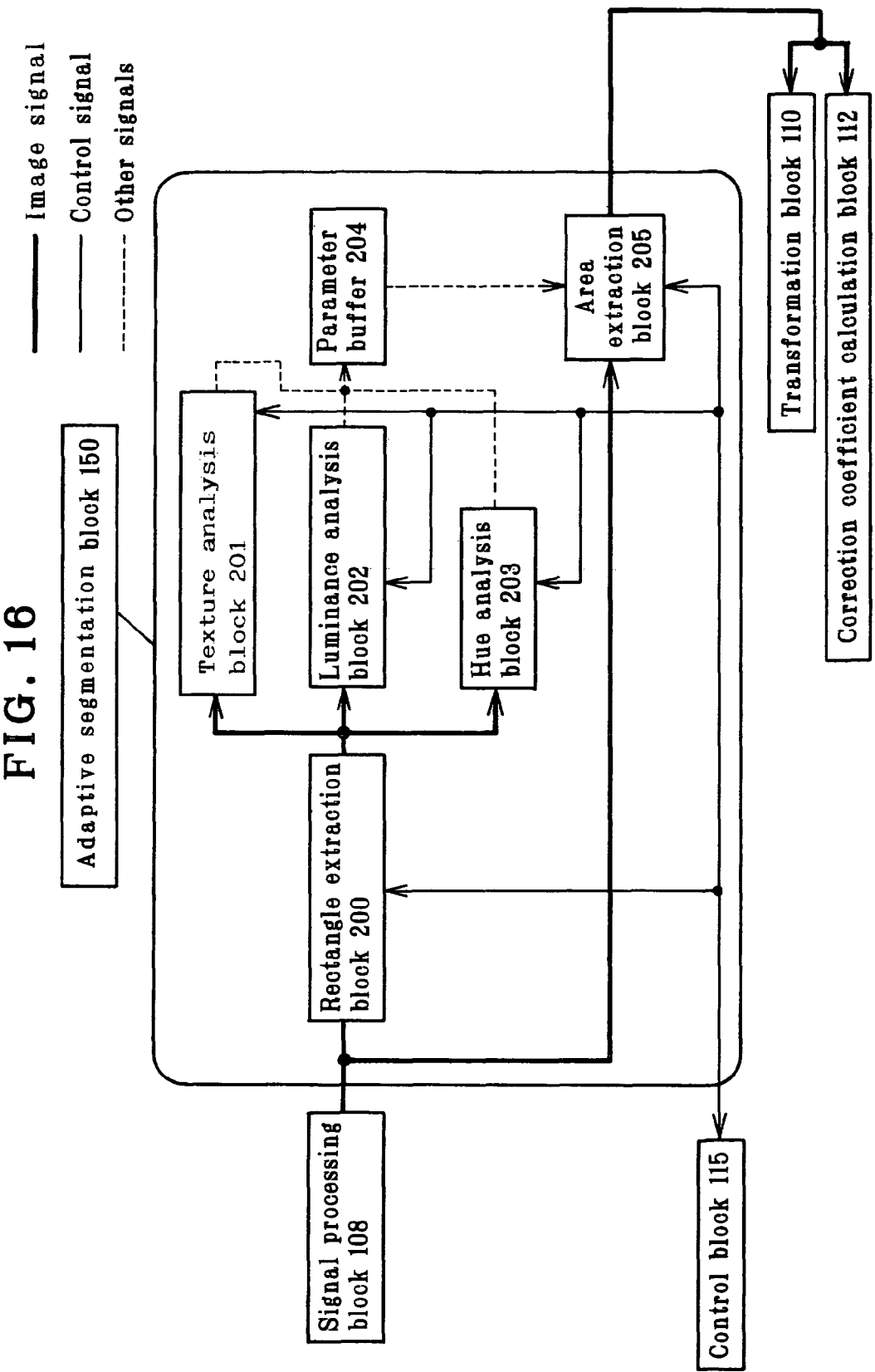
FIG. 16 is illustrative of the adaptive segmentation block.
Figure 17:
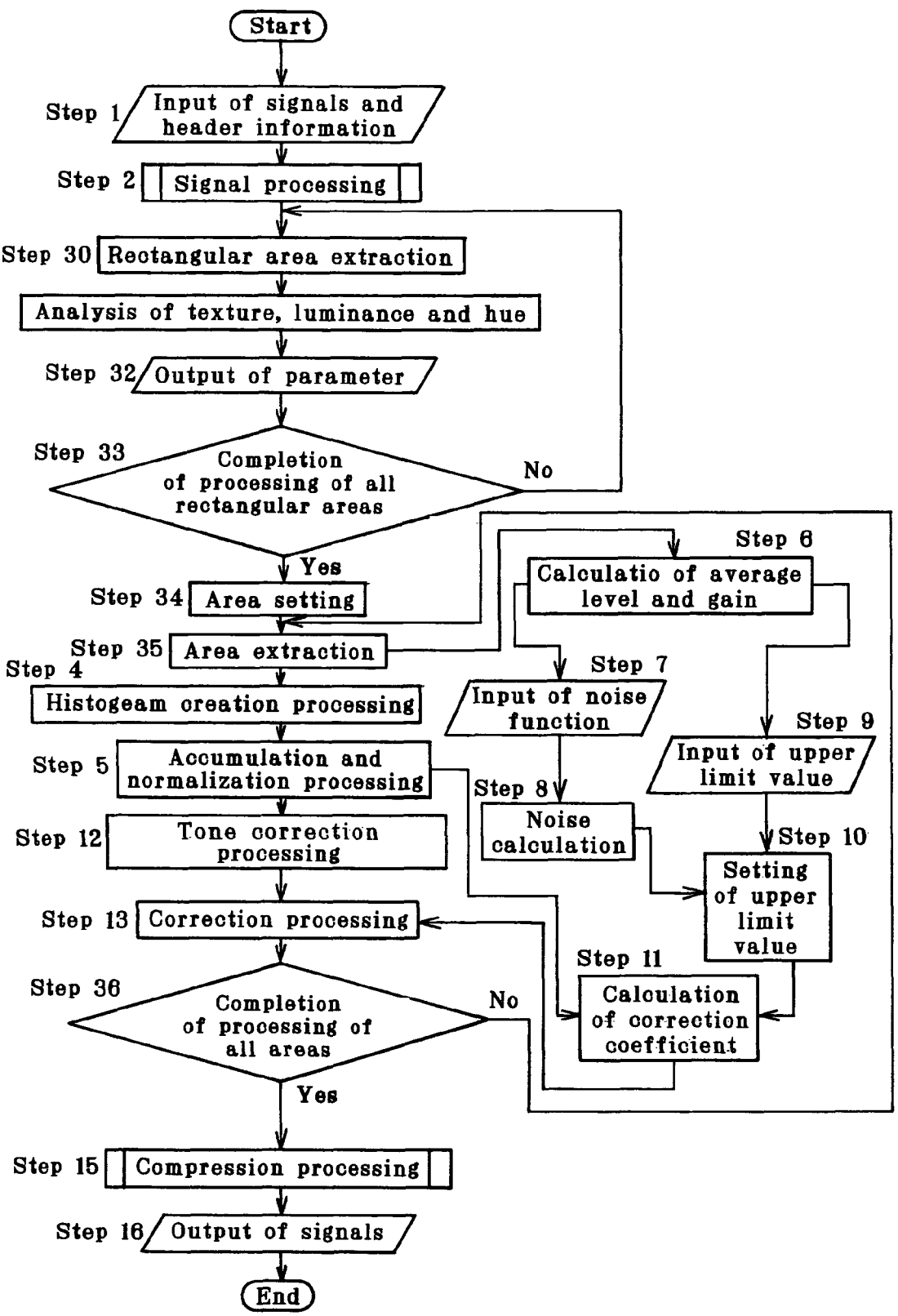
FIG. 17 is a flowchart of the third embodiment.

The third embodiment of the present invention is now explained. FIG. 15 is illustrative of the architecture of the third embodiment; FIG. 16 is illustrative of the architecture of the adaptive dividing block; and FIG. 17 is a flowchart of tone correction processing in the third embodiment.

In FIG. 15, the local area extraction block 109 in the first embodiment explained with reference to FIG. 1 is replaced by an adaptive segmentation block 150. Basic configuration is equivalent to that of the first embodiment, and the same components or parts are indicated by the same names and numerals. Only what differs from FIG. 1 is now explained. The adaptive segmentation block 150 is connected to the transformation block 110 and the correction coefficient calculation block 112. The control block 115 is bidirectionally connected to the adaptive segmentation block 150.

The third embodiment operates basically in much the same way as the first embodiment, and only what differs is explained. The flow of signals in FIG. 15 is described. Three-chip state image signals, to which known interpolation processing, white balance processing, etc. have been applied at the signal processing block 108, are forwarded to the adaptive segmentation block 150, at which each image signal is divided into areas having uniform characteristics based on texture information, luminance information and hue information. The divided areas are sequentially forwarded to the transformation block 110 and the correction coefficient calculation block 112 under control at the control block 115. The rest of processing is equivalent to that of the first embodiment, except that processing for each pixel of interest is replaced by processing for each divided area. At the output block 114, there are compression signals recorded and stored in a recording medium such as a memory card. In the embodiment of FIG. 15 too, therefore, the image signals subjected to such a series of processing as set forth above are going to be recorded and held in a given file in the aforesaid recording medium. The recording medium, in which an image signal for tone correction of the image signals is to be recorded, comprises a means for holding image signal data subjected to dividing processing for dividing the aforesaid image signal into at least one area, calculation processing for calculating a correction coefficient for each area, transformation processing for each area, and correction processing for making correction of each area after the aforesaid tone correction processing using the aforesaid correction coefficient.

FIG. 16 is illustrative of one example of the architecture of the adaptive segmentation block 150. The adaptive segmentation block 150 is built up of a rectangle extraction block 200, a texture analysis block 201, a luminance analysis block 202, a hue analysis block 203, a parameter buffer 204 and an area extraction block 205. The signal processing block 108 is connected to the rectangle extraction block 200 and the area extraction block 205, and the rectangle extraction block 200 is connected to the texture analysis block 201, the luminance analysis block 202 and the hue analysis block 203. The texture analysis block 201, the luminance analysis block 202 and the hue analysis block 203 are connected to the parameter buffer 204, and the parameter buffer 204 is connected to the area extraction block 205 that is in turn connected to the transformation block 110 and the correction coefficient calculation block 112.

The control block 115 is bidirectionally connected to the rectangle extraction block 200, the texture analysis block 201, the luminance analysis block 202, the hue analysis block 203 and the area extraction block 205. At the rectangle extraction block 200, on the basis of control at the control block 115, rectangular areas of given size, for instance, rectangular areas in 8×8 pixel unit here, are sequentially read out of the signal processing block 108. At the texture analysis block 201, texture information of the rectangular area is digitalized in terms of moment or entropy, for instance, based on statistics from simultaneous incidence matrix. The above digital data are forwarded to and recorded in the parameter buffer 204. At the luminance analysis block 202, a luminance signal Y is calculated by formula (12) from each pixel.

$$Y=0.29900R+0.58700G+0.11400B \quad (12)$$

Then, an average luminance $AV_y$ of the whole rectangular areas is calculated, and classified. Given a bit width of 12 bit=4096 here, the average luminance is uniformly divided into, for instance, 16 stages to create 16 classes. The above class data about luminance are forwarded to and recorded in the parameter buffer 204. At the hue analysis block 203, color difference signals Cb, Cr are calculated by formula (13) from each pixel.

$$Cb=-0.16874R-0.33126G+0.50000B$$

$$Cr=0.50000R-0.41869G-0.08131B \quad (13)$$

Then, a hue signal H is calculated by formula (14), and classified.

$$H=\tan^{-1}(Cb/Cr) \quad (14)$$

As for the hue class, for instance, the hue is uniformly divided in 8 directions to create 8 classes. The aforesaid class data about hue is forwarded to and recorded in the parameter buffer 204. After the completion of analysis of the whole rectangular areas, they are divided into uniform areas at the area extraction block 205 under control at the control block 115. This may be achieved by use of a known labeling technique wherein when at least two of, for instance, three items of information about texture, luminance and hue are the same, the same label is added to them.

At the area extraction block 205, after the completion of the above labeling, rectangular areas with the same label attached to them are extracted as one area for sequential forwarding to the transformation block 110 and the correction coefficient calculation block 112. In the aforesaid embodiment, while area segmentation is implemented on the basis of three items of information, say, texture, luminance and hue, it is understood that the present invention is not necessarily limited to it. For instance, the sole use of texture or any desired information combinations could make processing faster. With the above arrangement, high-definition image signals are obtainable even in scenes having high contrast while suppressing artifacts such as increased noise components, and a failure of color reproduction. Area segmentation, because of being adaptively implemented on the basis of information about texture, luminance, hue, etc. is capable of high-precision segmentation, making sure more effective tone processing.

The above embodiment is assumed to run on hardware; however, the present invention is not necessarily limited thereto. For instance, signals from CCD 102 may be produced as outputs in an unprocessed raw data form, and taking information from the control block 115 may be produced as header information outputs for running on separate software. FIG. 17 is a flowchart of tone correction processing on software in the third embodiment of the invention. Note here that to the same processing steps as in the flowchart of the tone correction processing according to the first embodiment of the invention shown in FIG. 9, as many as steps are assigned.

At Step 1, unprocessed image signals and header information including incidental information such as taking conditions are read. At Step 2, signal processing such as interpolation processing and white balance processing, all known in the art, is implemented. At Step 30, rectangular areas of given size, for instance, rectangular areas in 8×8 pixel unit are sequentially extracted. At Step 31, classification is implemented on the basis of information about texture, luminance and hue. At Step 32, the above class information is produced as an output. At Step 33, whether or not the extraction of all rectangular areas is over is determined, and if not, Step 30 is resumed or if yes, Step 34 takes over. At Step 34, segmentation into uniform areas is implemented on the basis of the above class information. At Step 35, the areas are sequentially extracted. At Step 4, a local area histogram is created. At Step 5, histograms are accumulated and normalized into a tone curve. The tone curve is forwarded to Step 11 and Step 12.

At step 6, each color signal average value $AV_c$ (c=R, G, B) and ISO sensitivity information are calculated. At Step 7, three coefficients $\alpha_{ci}$, $\beta_{ci}$ and $Y_{ci}$ are read for each color signal and ISO sensitivity, as represented by formula (2). At Step 8, the noise quantity $N_c$ of each color signal is estimated on the basis of formula (2) to forward it to Step 10. At Step 9, the upper limit value $Limit\_N_c$ of a subjectively allowable noise quantity is read and set, as shown in FIG. 6(*a*). At Step 10, based on the noise quantity $N_c$ transmitted from Step 8 and the upper limit value Limit_$N_c$ transmitted from Step 9, the upper limit gain Limit_gain that may be applied to image signals is calculated, as represented by formula (3). At Step 11, based on the tone curve transmitted from Step 5 and the upper limit gain Limit_gain transmitted from Step 10, a correction coefficient $k_c$ is calculated, as represented by formulae (4) and (5). At Step 12, tone correction processing is applied to the area on the basis of the tone curve transmitted from Step 5. At Step 13, correction is made by multiplication by the correction coefficient $k_c$ transmitted from Step 11. At Step 37, whether or not the processing of all the areas is over is determined, and if not, the user moves to Step 35 or if yes, the user moves to Step 15. At Step 15, compression processing such as known JPEG is implemented. At Step 16, post-processing signals are produced as outputs to finish the whole processing.

Figure 18:
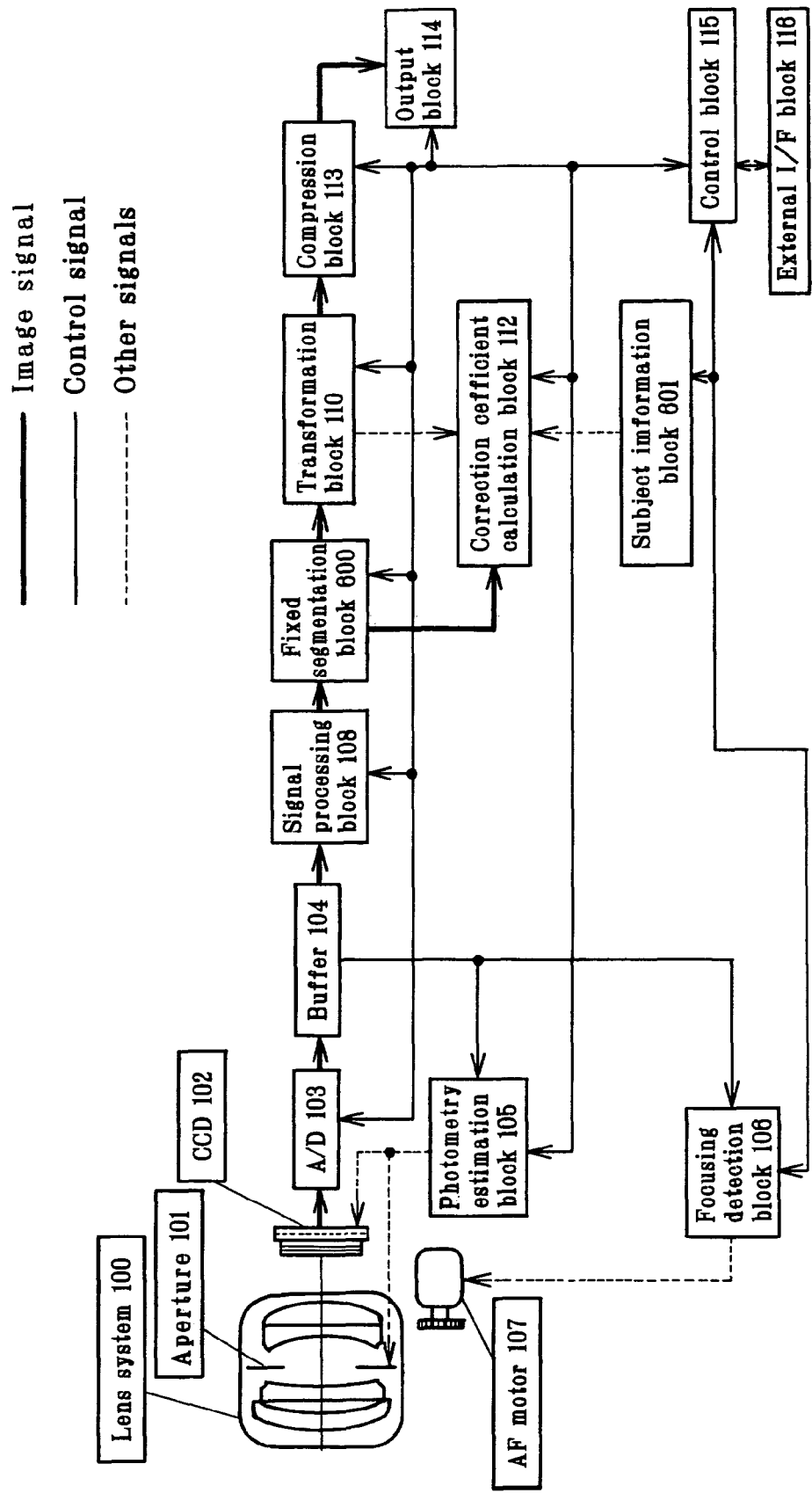
FIG. 18 is illustrative of the architecture of the fourth embodiment.
Figure 19:
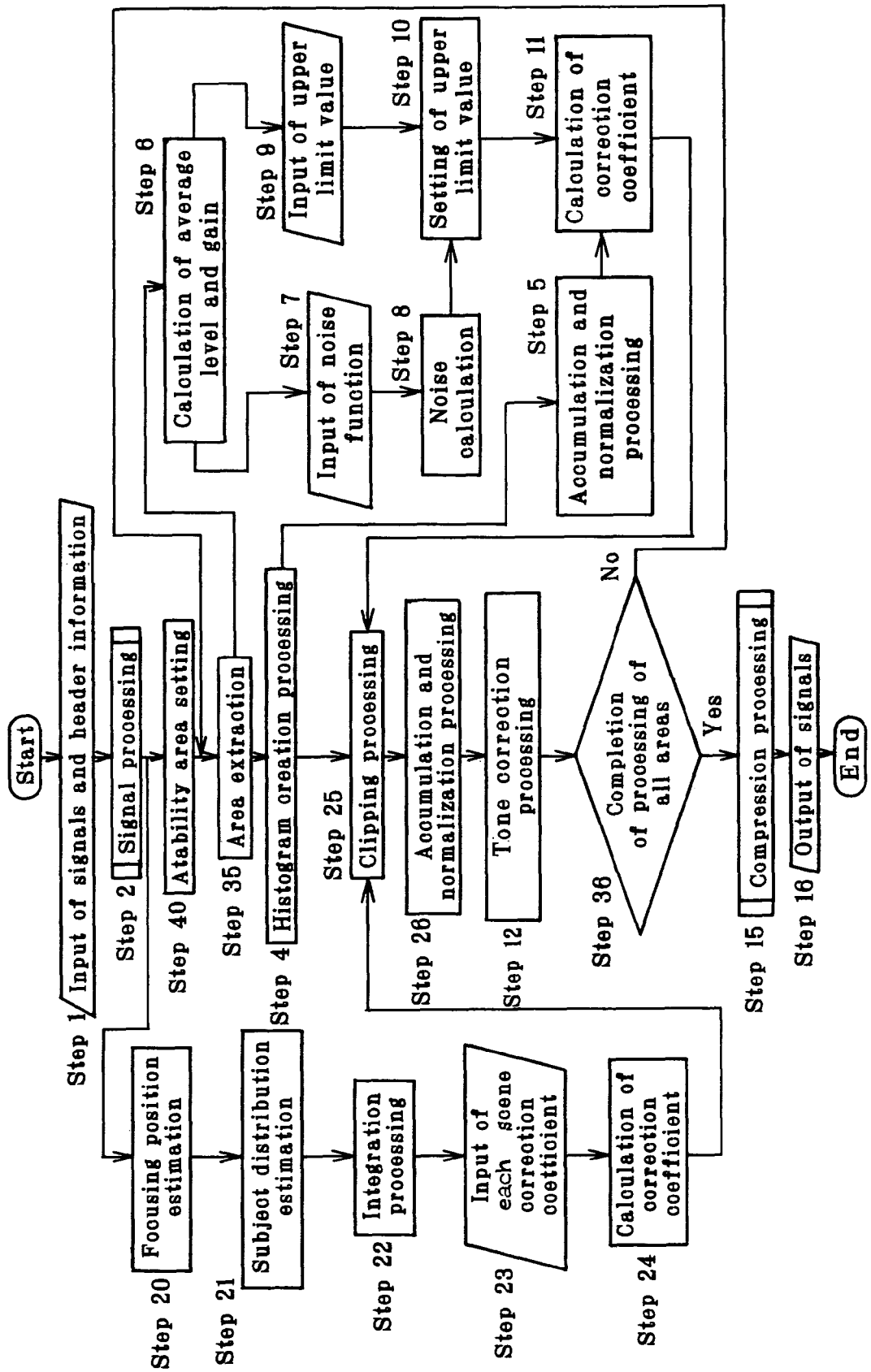
FIG. 19 is a flowchart of the fourth embodiment of the invention.

FIG. 18 is illustrative of the architecture of the fourth embodiment; and FIG. 19 is a flowchart of tone correction processing in the fourth embodiment.

In FIG. 18, the local area extraction block 109 in the second embodiment explained with reference to FIG. 10 is replaced by a fixed dividing block 600. Basic configuration is equivalent to that of the second embodiment, and the same components or parts are indicated by the same names and numerals. Only what differs from FIG. 10 is now explained. The signal processing block 108 is connected to the fixed dividing block 600 that is in turn connected to the transformation block 110 and the correction coefficient calculation block 112. The control block 115 is bidirectionally connected to the fixed dividing block 600.

The fourth embodiment operates basically in much the same way as the second embodiment, and only what differs is explained. The flow of signals is described with reference to FIG. 18. Three-chip state image signals, to which known interpolation processing, white balance processing, etc. have been applied at the signal processing block 108, are forwarded to the fixed dividing block 600, at which each image signal is divided into rectangular areas of given size, for instance, rectangular areas in 64×64 pixel unit here. The divided areas are sequentially forwarded to the transformation block 110 and the correction coefficient calculation block 112 under control at the control block 115. The rest of processing is equivalent to that of the second embodiment, except that processing for each pixel of interest is replaced by processing for each divided area. At the output block 114, there are compression signals recorded and stored in a recording medium such as a memory card. In the embodiment of FIG. 18 too, therefore, the image signals subjected to such a series of processing as set forth above are going to be recorded and held in a given file in the aforesaid recording medium. In the embodiment of FIG. 18, the recording medium, in which an image signal for tone correction of the image signals is to be recorded, comprises a means for holding image signal data subjected to dividing processing for dividing the aforesaid image signal into at least one area, calculation processing for calculating a correction coefficient for each area, and transformation processing for each area using the aforesaid correction coefficient.

With the above arrangement, high-definition image signals are obtainable even in scenes having high contrast while suppressing artifacts such as increased noise components and a failure of color reproduction. Area segmentation, because of providing areas of given size, enables faster processing to be implemented with achievement of less costly installations. While there is fixed area segmentation implemented in the above embodiment, it is understood that the present invention is not necessarily limited to it. As in the third embodiment of the present invention, the fixed area segmentation may be combined with the adaptive area segmentation. While the above embodiment has been described with reference to the primary-colors single-chip CCD, it is again understood that the present invention is not necessarily limited to it. For instance, the present invention may be equally applied to just only complementary color single-chip CCDs but also two- or three-chip CCDs.

The above embodiment is assumed to run on hardware; however, the present invention is not necessarily limited thereto. For instance, signals from CCD 102 may be produced as outputs in an unprocessed raw data form, and taking information from the control block 115 may be produced as header information outputs for running on separate software. FIG. 19 is a flowchart of tone correction processing on software in the fourth embodiment of the invention. Note here that to the same processing steps as in the flowchart of the tone correction processing according to the first embodiments of the invention shown in FIGS. 9, 14 and 17, as many as steps are assigned.

At Step 1, unprocessed image signals and header information including incidental information such as taking conditions are read. At Step 2, signal processing such as interpolation processing and white balance processing, all known in the art, is implemented. At Step 20, on the basis of focusing distance, the focusing position is classified according into three types, say, scenes, portraits and close-ups. At Step 21, a subject distribution concerning one single subject, two or more subjects, and the presence or absence of the sky are estimated on the basis of photometry estimation. At Step 22, the aforesaid focusing position and subject distribution are integrated to classify them into, for instance, the 6 types shown in FIG. 13(c). At Step 23, an each scene correction coefficient is read. At Step 24, the second correction coefficient k' is selected on the basis of the type of scene estimated at Step 22. At Step 40, rectangular areas of given size, say, areas in 64×64 pixel unit are sequentially extracted. At Step 35, areas are sequentially extracted. At Step 35, the areas are sequentially extracted. At Step 4, an area histogram is created. At Step 5, histograms are accumulated and normalized into the first round tone curve. The tone curve is forwarded to Step 11. At step 6, each color signal average value $AV_c$ (c=R, G, B) and ISO sensitivity information are calculated. At Step 7, three coefficients $\alpha_{ci}$ $\beta_{ci}$ and $Y_{ci}$ are read for each color signal and ISO sensitivity, as represented by formula (2).

At Step 8, the noise quantity $N_c$ of each color signal is estimated on the basis of formula (2) to forward it to Step 10. At Step 9, the upper limit value Limit_$N_c$ of a subjectively allowable noise quantity is read and set, as shown in FIG. 6(a). At Step 15, based on the noise quantity $N_c$ transmitted from Step 13 and the upper limit value Limit_$N_c$ transmitted from Step 9, the upper limit gain Limit_gain that may be applied to image signals is calculated, as represented by formula (6). At Step 11, based on the tone curve transmitted from Step 5 and the upper limit gain Limit_gain transmitted from Step 10, a correction coefficient $k_c$ is calculated, as represented by formulae (4) and (5). At Step 25, on the basis of the second correction coefficient k' transmitted from Step 24 and the correction coefficient $k_c$ transmitted from Step 11, a correction coefficient k is calculated, as represented by formula (7). Further, a clip value Clip is calculated, as represented by formula (8), and clipping processing is applied to the histogram transmitted from Step 4. At Step 27, histograms are accumulated and normalized into the second round tone curve. At Step 12, tone correction processing is applied to the area on the basis of the tone curve transmitted from Step 26. At Step 36, whether or not the processing of all the areas is over is determined, and if not, Step 35 is resumed or if yes, Step 15 takes over. At Step 15, compression processing such as known JPEG is implemented. At Step 16, post-processing signals are produced as outputs to finish the whole processing.

POSSIBLE INDUSTRIAL APPLICATIONS

In accordance with the present invention as described above, it is possible to provide an image signal processing apparatus, an image signal processing program, and an image signal recording medium, each capable of generating image signals that are of high definition yet substantially free of artifacts.

What we claim is:

1. An image signal processing apparatus for tone correction for an image signal, comprising:
    a calculation unit which calculates a correction coefficient for a pixel of interest and a neighborhood area in said image signal,
    a transformation unit which applies tone correction to said pixel of interest, and a correction unit which uses said correction coefficient to correct said pixel of interest after said tone correction,
    wherein said calculation unit comprises:
        a noise quantity estimation unit which estimates a quantity of noise in said pixel of interest and said neighborhood area,
        an upper limit value setting unit which sets an upper limit value of said noise quantity with respect to said pixel of interest,
        an upper limit gain calculation unit which calculates an upper limit gain based on said noise quantity and said upper limit value of said noise quantity, wherein the upper limit gain represents an upper limit on gain that can be applied, and
        a coefficient calculation unit which calculates said correction coefficient based on said upper limit gain.

2. An image signal processing apparatus for tone correction for an image signal, comprising:
    a calculation unit which calculates a correction coefficient for a pixel of interest and a neighborhood area in said image signal, and
    a transformation unit which uses said correction coefficient to apply tone correction to said pixel of interest,
    wherein said calculation unit comprises:
        a noise quantity estimation unit which estimates a quantity of noise in said pixel of interest and said neighborhood area,
        an upper limit value setting unit which sets an upper limit value of said noise quantity with respect to said pixel of interest,
        an upper limit gain calculation unit which calculates an upper limit gain based on said noise quantity and said upper limit value of said noise quantity, wherein the upper limit gain represents an upper limit on gain that can be applied, and
        a coefficient calculation unit which calculates said correction coefficient based on said upper limit gain.

3. An image signal processing apparatus according to claim 1, further comprising:
    a segmentation unit which divides said image signal into areas,
    wherein:
        said calculation unit calculates said correction coefficient for each of said areas,
        said transformation unit applies said tone correction to each of said areas, and
        said correction unit uses said correction coefficient to correct each of said areas after said tone correction, and
    wherein:
        said noise quantity estimation unit estimates said quantity of noise in each of said areas,
        said upper limit value setting unit sets said upper limit value of said noise quantity with respect to each of said areas,
        said upper limit gain calculation unit calculates said limit gain of each of said areas based on said noise quantity and said upper limit value of said noise quantity of said area, and
        said coefficient calculation unit calculates said correction coefficient for each of said areas based on said upper limit gain of said area.

4. An image signal processing apparatus according to claim 2, further comprising:
    a segmentation unit which divides said image signal into areas,
    wherein:
        said calculation unit calculates said correction coefficient for each of said areas, and
        said transformation unit uses said correction coefficient to apply said tone correction to each of said areas, and
    wherein:
        said noise quantity estimation unit estimates said quantity of noise in each of said areas,
        said upper limit value setting unit sets said upper limit value of said noise quantity with respect to each of said areas,
        said upper limit gain calculation unit calculates said upper limit gain of each of said areas based on said noise quantity and said upper limit value of said noise quantity of said area, and
        said coefficient calculation unit calculates said correction coefficient for each of said areas based on said upper limit gain of said area.

5. The image signal processing apparatus according to claim 1, further comprising a multiplication unit which multiplies said pixel of interest after said tone correction by said correction coefficient.

6. The image signal processing apparatus according to claim 2, wherein said transformation unit comprises a histogram calculation unit which calculates a histogram of said pixel of interest and said neighborhood area, a clipping unit which applies clipping processing to said histogram based on said correction coefficient, and a tone curve setting unit which sets a tone curve based on said histogram after said clipping processing.

7. The image signal processing apparatus according to claim 1 or 2, wherein said calculation unit further comprises a specific color extraction unit which extracts a specific color of said pixel of interest and said neighborhood area, and wherein said coefficient calculation unit calculates said correction coefficient based on a proportion of said pixel of interest occupied by said specific color.

8. The image signal processing apparatus according to claim 1 or 2, wherein said transformation unit comprises a histogram calculation unit which calculates a histogram of said pixel of interest and said neighborhood area, and a tone curve setting unit which sets a tone curve based on said histogram.

9. The image signal processing apparatus according to claim 1 or 2, wherein said transformation unit comprises a tone curve setting unit which sets a predetermined tone curve with respect to said pixel of interest.

10. The image signal processing apparatus according to claim 3, wherein said transformation unit comprises a multiplication unit which multiplies each of said areas after said tone correction by said correction coefficient calculated for said area.

11. The image signal processing apparatus according to claim 1 or 3, further comprising an avoidance unit which avoids a part of said tone correction by said transformation unit and said correction by said correction unit when said correction coefficient satisfies a given condition.

12. The mage signal processing apparatus according to claim 4, wherein said transformation unit comprises a histogram calculation unit which calculates a histogram of each of said areas, a clipping unit which applies clipping processing to said histogram based on said correction coefficient, and a tone curve setting unit which sets a tone curve based on said histogram after said clipping processing.

13. The image signal processing apparatus according to claim 3 or 4, wherein said calculation unit further comprises a specific color extraction unit which extracts a specific color of each of said areas, and wherein said coefficient calculation unit calculates said correction coefficient based on a proportion of each of said areas occupied by said specific color.

14. The image signal processing apparatus according to claim 3 or 4, wherein said segmentation unit comprises an adaptive segmentation unit which divides said image signal into areas based on at least one of color information, luminance information, and texture information of said image signal.

15. The image signal processing apparatus according to claim 3 or 4, wherein said segmentation unit comprises a fixed segmentation unit which divides said image signal into areas of a given size.

16. The image signal processing apparatus according to claim 3 or 4, wherein said transformation unit comprises a histogram calculation unit which calculates a histogram of each of said areas, and a tone curve setting unit which sets a tone curve based on said histogram.

17. The image signal processing apparatus according to claim 3 or 4, wherein said transformation unit comprises a tone curve setting unit which sets a predetermined tone curve with respect to each of said areas.

18. The image signal processing apparatus according to claim 2 or 4, further comprising an avoidance unit which avoids a part of said tone correction by said transformation unit when said correction coefficient satisfies a given condition.

19. The image signal processing apparatus according to claim 2 or 4, wherein said calculation unit further comprises a subject information extraction unit which extracts subject information from said image signal, and wherein said coefficient calculation unit calculates said correction coefficient based on said subject information.

20. The image signal processing apparatus according to any one of claims 1 to 4, wherein said upper limit value setting unit comprises a memory in which there is a noise quantity at a given ISO sensitivity recorded.

21. A non-transitory computer-readable recording medium having an image signal processing program stored thereon that is executable by a computer to perform functions comprising:
    calculating a correction coefficient for a pixel of interest and a neighborhood area in an image signal,
    applying tone correction to said pixel of interest, and
    correcting said pixel of interest after said tone correction, based on said correction coefficient,
    wherein calculating the correction coefficient for said pixel of interest and said neighborhood area comprises:
        estimating a quantity of noise in said pixel of interest and said neighborhood area,
        setting an upper limit value of said noise quantity with respect to said pixel of interest,
        calculating an upper limit gain based on said noise quantity and said upper limit value of said noise quantity, wherein the upper limit gain represents an upper limit on gain that can be applied, and
        calculating said correction coefficient based on said upper limit gain.

22. The non-transitory computer-readable recording medium according to claim 21, wherein said functions further comprise:
    dividing said image signal into areas,
    wherein:
        said correction coefficient is calculated for each of said areas, and
        each of said areas is corrected after said tone correction, based on said correction coefficient, and
    wherein:
        said quantity of noise is estimated in each of said areas,
        said upper limit value of said noise quantity is set with respect to each of said areas,
        said upper limit gain is calculated for each of said areas based on said noise quantity and said upper limit value of said noise quantity of said area, and
        said correction coefficient is calculated for each of said areas based on said upper limit gain of said area.

23. The non-transitory computer-readable recording medium according to claim 21, wherein said tone correction comprises multiplying said pixel of interest by said correction coefficient after said tone correction.

24. The non-transitory computer-readable recording medium according to claim 22, wherein said tone correction comprises multiplying each of said areas by said correction coefficient for said area after said tone correction.

25. A non-transitory computer-readable recording medium having an image signal processing program stored thereon that is executable by a computer to perform functions comprising:
    calculating a correction coefficient for a pixel of interest and a neighborhood area in said image signal, and
    applying tone correction to said pixel of interest based on said correction coefficient,
    wherein calculating the correction coefficient for said pixel of interest and said neighborhood area comprises:
        estimating a quantity of noise in said pixel of interest and said neighborhood area,
        setting an upper limit value of said noise quantity with respect to said pixel of interest,
        calculating an upper limit gain based on said noise quantity and said upper limit value of said noise quantity, wherein the upper limit gain represents an upper limit on gain that can be applied, and
        calculating said correction coefficient based on said upper limit gain.

26. The non-transitory computer-readable recording medium according to claim 25, wherein said functions further comprise:
    dividing said image signal into areas,
    wherein:
        said correction coefficient is calculated for each of said areas, and said tone correction is applied to each of said areas, based on said correction coefficient, and wherein:

said quantity of noise is estimated in each of said areas, said upper limit value of said noise quantity is set with respect to each of said areas, said upper limit gain is calculated for each of said areas based on said noise quantity and said upper limit value of said noise quantity of said area, and said correction coefficient is calculated for each of said areas based on said upper limit gain of said area.

27. The non-transitory computer-readable recording medium according to claim 25, wherein said tone correction comprises calculating a histogram of said pixel of interest and said neighborhood area, applying clipping processing to said histogram based on said correction coefficient, and setting a tone curve based on said histogram after said clipping processing.

28. The non-transitory computer-readable recording medium according to claim 26, wherein said tone correction comprises calculating a histogram of each of said areas, applying clipping processing to said histogram based on said correction coefficient, and setting a tone curve based on said histogram after said clipping processing.

29. The non-transitory computer-readable recording medium according to claim 25 or 26, wherein calculating said correction coefficient comprises extracting subject information in said image signal, and calculating said correction coefficient based on said subject information.

30. The non-transitory computer-readable recording medium according to claim 22 or 26, wherein calculating said correction coefficient for each of said areas comprises extracting a specific color of each of said areas, and calculating said correction coefficient based on a proportion of each of said areas occupied by said specific color.

* * * * *